(12) United States Patent
Kunkel et al.

(10) Patent No.: US 10,680,721 B2
(45) Date of Patent: Jun. 9, 2020

(54) SYSTEMS AND METHODS FOR OVER-THE-HORIZON COMMUNICATION

(71) Applicant: Fourth State Communications, LLC, Stafford, VA (US)

(72) Inventors: Levi E. Kunkel, Stafford, VA (US); John M. Edwards, II, Washington, DC (US)

(73) Assignee: FOURTH STATE COMMUNICATIONS, LLC., Stafford, VA (US)

( * ) Notice: Subject to any disclaimer, the term of this patent is extended or adjusted under 35 U.S.C. 154(b) by 0 days.

(21) Appl. No.: 16/539,418

(22) Filed: Aug. 13, 2019

(65) Prior Publication Data
US 2020/0059304 A1 Feb. 20, 2020

Related U.S. Application Data

(60) Provisional application No. 62/718,723, filed on Aug. 14, 2018.

(51) Int. Cl.
*H04B 10/90* (2013.01)
*H04B 13/00* (2006.01)

(52) U.S. Cl.
CPC .................................. *H04B 10/90* (2013.01)

(58) Field of Classification Search
CPC ....................................................... H04B 10/90
USPC ........................................................ 455/899
See application file for complete search history.

(56) References Cited

U.S. PATENT DOCUMENTS

| 4,712,155 A | 12/1987 | Eastlund et al. |
| 4,999,637 A | 3/1991 | Bass |
| 5,041,834 A | 8/1991 | Koert |
| 5,053,783 A | 10/1991 | Papadopoulos |
| 5,134,715 A | 7/1992 | Part et al. |
| 7,286,766 B2 | 10/2007 | Shelton et al. |
| 7,533,995 B2 | 5/2009 | Momiuchi et al. |
| 2004/0134616 A1 | 7/2004 | Sago et al. |
| 2004/0141752 A1 | 7/2004 | Shelton et al. |
| 2005/0255255 A1 | 11/2005 | Kawamura et al. |
| 2007/0215946 A1 | 9/2007 | Eastlund |
| 2007/0238252 A1 | 10/2007 | Eastlund |

(Continued)

OTHER PUBLICATIONS

E. W. Banios, Plasma Considerations in Space Communication, IEEE vol. 2, Nov. 1966, pp. 333-339.*
PCT/2019/046340 ISA Search Report dated Nov. 4, 2019.

*Primary Examiner* — Lee Nguyen
(74) *Attorney, Agent, or Firm* — Fox Rothschild LLP

(57) ABSTRACT

A communication system and method is described, including two or more transceivers at different locations, in which a region of the atmosphere at an altitude ranging from 150-350 KM is modified by applying an E-Field strength of 0.2 V/m to create a High-Frequency Ionized Lines/High-Frequency Plasma Lines (HFIL/HFPL) region. The HFIL/HFPL region provides a means for incoming RF transmission signals to be isotropically repeated and received by transceivers at other distant locations within line-of-sight of the HFIL/HFPL region. Incoming RF transmissions into the HFIL/HFPL region may use radio frequencies ranging from 100 MHz-20 GHz. The system described offers a means for users to transmit data from one over-the-horizon location to another at distances up to 4800 km without wires or physical satellites.

20 Claims, 15 Drawing Sheets

(56) References Cited

U.S. PATENT DOCUMENTS

| | | |
|---|---|---|
| 2008/0156406 A1 | 7/2008 | Breed |
| 2013/0221845 A1 | 8/2013 | Edwards et al. |
| 2017/0066890 A1 | 3/2017 | Oser et al. |
| 2017/0339776 A1 | 11/2017 | Knoll et al. |

* cited by examiner

SYSTEMS AND METHODS FOR OVER-THE-HORIZON COMMUNICATION

CROSS REFERENCE TO RELATED APPLICATIONS

This application incorporates by reference U.S. application Ser. No. 15/495,341 filed Apr. 24, 2017, U.S. Provisional Application Ser. No. 62/327,151 filed Apr. 25, 2016 and U.S. Provisional Application Ser. No. 61/785,791, filed Mar. 14, 2013, in their entirety as if fully disclosed herein. This application claims priority to U.S. Provisional Application Ser. No. 62/718,723, filed Aug. 14, 2018, which is incorporated by reference in its entirety.

BACKGROUND

This disclosure relates to radio frequency communications systems and methods including, for example, transferring information from one location to another through the use of atmospheric modification, and creating an environment for data transmissions to be isotropically repeated from or to one or more distant locations within line-of-sight.

Typical methods for manipulating the atmosphere may include: acoustic manipulation, gyro-resonance manipulation, radio frequency manipulation, visible and non-visible light spectrum manipulation, etc. While there may be several methods for manipulating the atmosphere, in order to transfer information from one location to another, radio frequency (RF) and LASER induced atmospheric manipulation are currently among the most prevalent methods.

For example, U.S. Pat. Nos. 5,134,715, 4,999,637, U.S. 2007/0215946, U.S. 2007/0238252, U.S. Pat. Nos. 5,053,783, and 5,041,834, the disclosures of which are incorporated by reference as if fully disclosed herein, describe the use of artificially ionized atmosphere for the purpose of refracting radio frequency signals from one location to another location.

Other methods may include the use of optical images in the atmosphere to be observed at another distant location for information transfer from one location to another location. For example, U.S. Pat. No. 7,533,995, the disclosure of which is incorporated by reference as if fully disclosed herein, describes the use of LASERs for forming a visible image in the atmosphere. In another example, U.S. Pat. No. 7,286,766, the disclosure of which is incorporated by reference as if fully disclosed herein, describes the use of a "laser guide star" with modulated light, in order to create a free-space optical communications link. Other examples include the use of LASERs for irradiating the atmosphere for astronomy or communications purposes. However, the primary limitation of the optical communications method is its lack of all-weather reliability over long distances.

The conventional methods for telecommunication systems described above require the using physical satellites for telecommunications. Moreover, a user of the conventional systems does not have the ability to employ these conventional systems and methods in the locations and altitudes of their choosing based on the user's unique requirements, as the physical satellites, required by these conventional systems are bound to orbital mechanics.

SUMMARY

The present disclosure relates, for example, to a process for communications through the use of atmospheric modification utilizing high-frequency (HF) radio frequencies (RF), allowing for distant RF transmission sources within the ultra-high frequency (UHF) range to be isotropically scattered to other distant locations, enabling long-range communication. Communication may comprise the transfer of network timing information, navigation information, and other information related to the field of communications in the internet of things. There are several configurations, through which this process can be employed. Herein, there are two primary exemplary types of configurations; a Network Broadcast configuration, and a Meshed Network configuration. Three main components that may comprise each configuration are a High-Frequency (HF) Pump, High-Frequency Ionized Lines (HFIL)/High-Frequency Plasma Lines (HFPL), and a Transmitter/Receiver (i.e., a transceiver).

The HF Pump may include a RF generator device to produce, for example, RF radiation, which may create High-Frequency Ionized Lines (HFIL) or High-Frequency Plasma Lines (HFPL) in the atmosphere at an altitude ranging from 150-350 kilometers (km) and specified by the user's requirements. The HF Pump location may include a power and frequency controller connected to a RF synthesizer, in which the RF synthesizer operates between 1-10 Mega-Hertz (MHz) to regulate HFIL/HFPL altitude through hourly, daily, and solar cycles. A power generation device, operating between 1-5 Mega-Watts (MW), may be connected to the HF Pump, allowing for creation of the HFIL/HFPL to be maintained at 0.2 Volts per meter (V/m) and be adjusted for altitude control. RF amplifiers may be included with the HF Pump to ensure sufficient power is transmitted into the atmosphere, in conjunction with the power generation device. The HF Pump may utilize circularly polarized antennas to ensure that maximum efficiency of power is transmitted into the atmosphere to maintain an E-Field strength having a range from 0.1V/m to 0.3V/m at an altitude, for example 0.2V/m at 150 km-350 km. Additionally, the HF Pump may consist of a HFIL/HFPL altitude controller to ensure altitude and transmission repeater consistency for communications applications.

The Network Broadcast configuration may include transmitter(s) and receiver(s). A transmitter/receiver in the network broadcast configuration may include, for example, a data transmitter and a data receiver, i.e., a transceiver. A data transmitter may include a controller connected to a modem, where user data is injected. The modem may be connected to a RF synthesizer operating at frequencies between 100 Mhz to 20 GHz. The RF synthesizer may be connected to either a dual or quad diversity frequency controller. The RF synthesizer may include frequency diversity types, such as Space, Frequency, Angle, or Polarization. The dual or quad diversity frequency controller may be connected to a RF amplifier, where an electrical power generator, capable of producing at least 1 MW-5 MW of power, may power the RF amplifier. The RF amplifier may be connected to a transmitting antenna capable of producing a gain of 20-80 dBi. A data receiver may be co-located with the data transmitter. A data receiver, for example, may include a receive antenna, having an aperture between 4 m²-20 m². The receive antenna may be connected to a dual or quad diversity frequency converter able to process receive signals as low as −100 dBm. The dual or quad diversity frequency converter may be connected to the modem, where data is provided to the user. The modem may be connected to a controller for overall system control and monitoring.

Network Broadcast Configuration Equipment String. In some embodiments, this configuration may include either a half-duplex or full-duplex communications system, in which a single location disseminates information to multiple locations. In turn, other locations disseminate information to other distant locations, creating a communications network. In some embodiments, a communications system in the configuration includes, for example, a HF Pump and multiple RF Transmitter/Receivers (i.e., transceivers).

Network Broadcast Configuration Signal Flow. In various embodiments, the network broadcast process may begin when high-frequency electromagnetic energy from the HF Pump location extends into the atmosphere at an altitude ranging from 150 km-350 km. The electromagnetic energy creates a region of either HFIL or HFPL ranging from 5 km-10 km wide and 1 km-5 km high. In some embodiments, the HFIL/HFPL region may be maintained at an E-Field value having a range from 0.1V/m to 0.3V/m to provide an area for transmissions originating from transceivers to be isotropically repeated to other distant transceivers. Moreover, the HFIL/HFPL region may be maintained at 0.2V/m to provide an area for transmissions originating from transceivers to be isotropically repeated to other distant transceivers. Hereinafter, the HFIL/HFPL region is described with maintaining an E-Field value of 0.2V/m, but it is noted that the HFIL/HFPL region may be maintained at other values, such as 0.1V/m and 0.3V/m, or within the range of 0.1V/m to 0.3V/m. Once the HFIL/HFPL region is established, a transceiver directs a transmission into the HFIL/HFPL region. The transmission from the transceiver may range from 100 MHz-20 GHz at a power of 1-1,000 Kilo-Watt (KW) from a distance up to 4,800 km into the HFIL/HFPL region. Once the RF transmission from the transceiver contacts the HFIL/HFPL region, the transmission is isotropically repeated outward and changed to a transmission wave approximately 4 MHz higher than the transmission's original frequency. Generally, the radiated transmission will be approximately its original value plus the frequency value of the HF Pump. Upon contact with the HFIL/HFPL region, the transmission wave is now approximately 4 MHz higher than it started, and is isotropically radiated outward in all directions. Any transceiver within line-of-sight of the isotropic scattering may be able to receive the data from the original transceiver. Moreover, any transceiver within line-of-sight of the HFIL/HFPL region may be able to receive data from any other transceiver. This process may be the same for any transceiver within line-of-sight of the HFIL/HFPL region.

Meshed Network Configuration Equipment String. In some embodiments, a communications system in a telecommunications link relay configuration is disclosed that allows, for example, transmitting, receiving, and relaying full-duplex information from one location to another location. The equipment string comprising the telecommunications link configuration may include two HF Pump locations ranging from 1 MHz-10 MHz, 1 MW-5 MW, 20 dB-80 dB gain, with circular polarization. The two HF Pump locations may create two separate but slightly overlapping regions of HFIL/HFPL. Within line-of-sight of the first HFIL/HFPL region, there may be at least two transceivers having the same characteristics as the transceivers of the network broadcast configuration, in which the transmitter of the transceiver may consist of frequencies ranging from 100 MHz-20 GHz at a power of 1 KW-1,000 KW and a gain ranging from 20 dBi-85 dBi able to span a line-of-sight distance up to 4,800 km with the HFIL/HFPL region. Another HFIL/HFPL region may include the same elements as the first HFIL/HFPL region and both HFIL/HFPL line-of-sight regions may slightly overlap. The slight overlap in HFIL/HFPL regions may consist of two or more co-located and connected transceivers having the same characteristics of transceivers previously described. For example, a subscriber in the first HFIL/HFPL Region may transmit data intended for the transceiver within the HFIL/HFPL Line-of-Sight Relay Overlap Region, shared with both the first HFIL/HFPL Region and the second HFIL/HFPL Region. The receiver of the transceiver, located in the HFIL/HFPL Line-of-Sight Relay overlap Region, may receive the transmitted data from the subscriber in the first HFIL/HFPL Region. The data is routed to the transmitter of the transceiver co-located in the HFIL/HFPL Overlap Region for re-transmission to the second HFIL/HFPL Region. The re-transmitted data from the subscriber within the first HFIL/HFPL Region may be repeated by the second HFIL/HFPL Region and subsequently repeated at a frequency approximately 4 MHz higher than its original transmission frequency. The data may then be received at another subscriber location within the second HFIL/HFPL Region.

Embodiments described herein are superior to other methods involving over-the-horizon telecommunications, by providing ultra-low latency, all-weather reliability, and reduction in cost-per-mile over long distances. Additionally, embodiments described herein do not require the use of telecommunication satellites.

Moreover, where others have tried and failed to create an ionized region of the atmosphere for the purpose of refracting a radiation signal from one location to another, embodiments disclosed herein overcome those past obstacles. Typically, when refracting a radiation signal off of an ionized region of atmosphere, a large flat surface is required. However, the power and control required to do this is impractical. The disclosed embodiments are able to overcome the challenges of refraction by avoiding it altogether. This is made possible through the creation of HFIL/HFPL at a sustained power of 0.2V/m at an altitude of 150 km-350 km. These characteristics enable an HFIL/HFPL region that can repeat telecommunications transmissions in the Ultra-High Frequency (UHF) range, generally understood to be 100 MHz to 20 GHz, entering the transmissions and isotropically scatter the telecommunications transmission in all directions. The UHF frequency range described may change based on weather conditions and spectrum availability. This construct avoids the previous challenges of producing large, flat refractive surfaces altogether.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

Embodiments will be described with reference to the following drawing figures, in which like numerals represent like items throughout the Figures.

DETAILED DESCRIPTION

Figure 1:
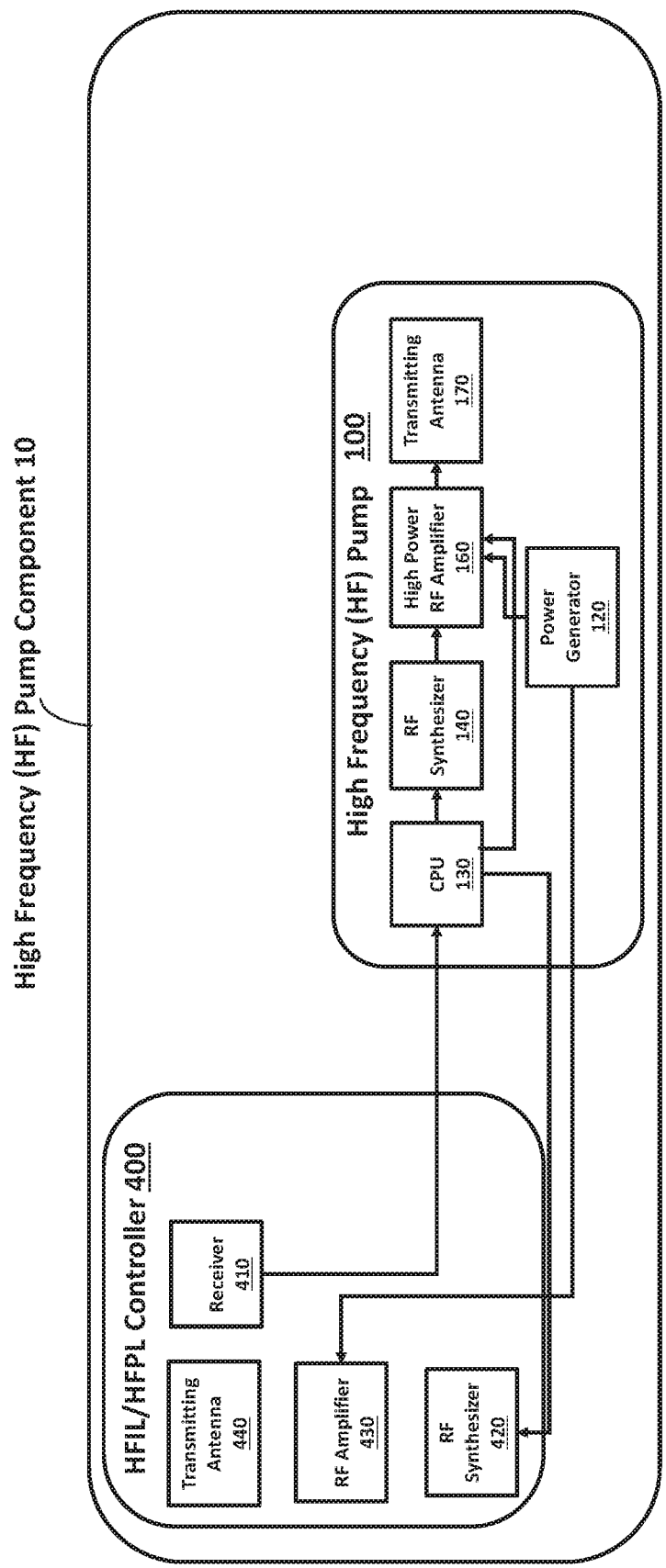
FIG. 1 is a diagram of a HF Pump configuration.

Implementations of the disclosed scenarios are described with reference to the attached figures. The Figures are not drawn to scale and are provided merely illustrative of the embodiments of the disclosure. Several aspects are described below with reference to example applications for illustration. It should be understood that numerous specific details, relationships, and methods are set forth to provide a full understanding of the disclosed implementations. One having ordinary skill in the relevant art, however, will readily recognize that the embodiments of the disclosure can be practiced without one or more of the specific details or with other methods. In other instances, well-known structures or operation are not shown in detail to avoid obscuring the description of the embodiments. The disclosed implementations are not limited by the illustrated ordering of acts or events, as some acts may occur in different orders and/or concurrently with other acts or events. Furthermore, not all illustrated acts or events are required to implement a methodology in accordance with the disclosed scenarios.

As used in the disclosure, a statement that a device or system is "in electronic communication with" another device or system means that devices or systems are configured to send data, commands and/or queries to each other via a communications network. The network, for example, may be a wired or wireless network such as a local area network, a wide area network, an intranet, the Internet or another network.

A "computing device" refers to a computer, a processor and/or any other component, device or system that performs one or more operations according to one or more programming instructions.

The term "data" may refer to physical signals that indicate or include information. A "data bit" may refer to a single unit of data.

The embodiments described herein provide a means for data to be moved between two or more distant locations beyond line-of-sight. In particular, the embodiments described herein provide a means, for example, for maintaining an Electric Field (E-Field) value. By maintaining the E-field value, an altitude of the HFIL/HFPL region may be controlled, and a maximum scattering/reflective density may be sustained. By controlling the altitude of the HFIL/HFPL region, over-the-horizon telecommunications is achievable, particularly for long-range communications where the HFIL/HFPL region may drift and decrease in altitude. The HFIL/HFPL region may be created based on the type of transmission that is needed. For example, broadband applications may benefit by having the HFIL/HFPL region located in a higher altitude, whereas, financial applications may benefit by having the HFIL/HFPL region located in a lower altitude, in which transmissions may have lower latency.

While several use cases and embodiments exist, the overall construct of each involves the use of HFIL/HFPL, created by a HF Pump with a circularly polarized Radio Frequency (RF) ranging from 1 MHz-10 MHz at a power level ranging from 1 MW-5 MW to maintain the E-Field value ranging from 0.1V/m to 0.3V/m, of which 0.2V/m is considered to be optimal for atmospheric modification at an altitude, specified by the user, ranging from 150 km-350 km. In one or more cases, the HFIL/HFPL region may reside at an altitude of 225 km, which may vary plus or minus 10% of the altitude. Hereinafter, the HFIL/HFPL region is described with maintaining an E-Field value of 0.2V/m at an altitude ranging from 150 km-350 km, but it is noted that the HFIL/HFPL region may be maintained at other values, such as 0.1V/m and 0.3V/m, or within the range of 0.1V/m to 0.3V/m. A Transmitter/Receiver (transceiver) at one location within line-of-sight of the HFIL/HFPL region sends a transmission ranging from 100 MHz-20 GHz with a gain ranging from 20 dB-80 dB, and a power level ranging from 1 KW-100 KW into the HFIL/HFPL region where the transmission is repeated by the HFIL/HFPL region and re-transmitted from the HFIL/HFPL region at a new frequency approximately 4 MHz higher than its original value. This isotropically repeated, re-transmitted transmission signal, still carrying the data it originated with, is received at another distant transceiver also located within line-of-sight of the HFIL/HFPL region. This process serves the basis for the processes described subsequently. The three major components, HF Pump, HFIL/HFPL Region, and transceiver, are further described below with reference to the Figures.

Referring to FIG. 1, in some embodiments, HF Pump Component 10 may be used to convert electrical power into high-power radio frequencies (RF). The HF Pump Component 10 may include at least two sub-components, such as HF Pump 100 and HF Pump Controller 400.

In various embodiments, a main function of the HF Pump 100 is to produce High-Frequency (HF) RF at high-power, in order to produce a High-Frequency Ionized Lines/High-Frequency Plasma Lines (HFIL/HFPL) region. The sub-components of the HF pump 100 work together to produce an E-Field strength, i.e., an E-Field value, of 0.2V/m at an altitude of 150 km-350 km. The sub-components of the HF Pump 100 may include: Power Generator 120, Computer Processing Unit (CPU) 130, RF Synthesizer 140, High-Power RF Amplifier 160, and Transmitting Antenna 170. To create the HFIL/HFPL region, the HF Pump 100 may be configured to radiate RF matched to or within a range of a Critical Frequency at a particular altitude in the atmosphere. In one or more cases, the RF may match the Critical Frequency. In one or more other cases, the RF may be within 0.5 MHz under the Critical Frequency. The Critical Frequency may be a gyro-harmonic frequency. The Critical Frequency may range from 500 kHz to 7 MHz. The HF Pump 100 may be configured to radiate RF matched to or within a range of the Critical Frequency, based on the change in the Critical Frequency. The Critical Frequency for a particular altitude in the atmosphere may be location, time, and/or environmentally dependent (i.e., ionospheric conditions), all of which may impact the reliability of a communications link. For example, the critical frequency may vary based on solar influences that may occur, for example, daily or annually. In another example, the critical frequency may vary based on the auroral effects near the poles (e.g., in the Artic region). In yet another example, geographic locations in the mid-latitudes may require different critical frequencies than geographic locations near the poles. By matching or coming within a range of the Critical Frequency, a user may maintain the HFIL/HFPL region regardless of location, time, and ionospheric conditions. In one or more cases, the HF Pump 100 may radiate RF to create the HFIL/HFPL region at an altitude to suit a particular transmission application. For example, for the cases in which transmissions are sent in financial markets, the HFIL/HFPL region may be set at a lower altitude, e.g., 175 km, in order to reduce latency between transmissions. In another example, for the cases in which transmissions are utilized in broadband applications, the HFIL/HFPL region may be set at a higher altitude, e.g., 325 km, in order to maximize the distance at which a transmission can be sent and/or received.

Power Generator 120 may provide electrical power to be converted to electromagnetic energy. The Power Generator 120 can operate at a flexible power ranging from 1 MW-5 MW. The HFIL/HFPL Region may be maintained at a consistent E-Field strength of 0.2V/m when atmospheric conditions, such as daily (day or night) or seasonal fluctuations in the atmosphere occur due to solar changes, thereby requiring flexibility in adjusting power. Other atmospheric conditions may include solar flare activity that may be unpredictable and requires adjustments in power to maintain the 0.2V/m E-Field strength at any given time to ensure reliability of the communications paths.

CPU 130 may include one or more processors and non-transitory computer-readable memory. The memory may contain programming instructions in the form of a software application that, when executed by the processor, causes the device to perform one or more signal processing operations according to the programming instructions. The CPU 130 may provide data either to the HF Pump 100, in order to provide control for the maintaining of the 0.2V/m E-Field strength, or to a Transmitter/Receiver 300 (hereinafter Transceiver 300), in order to provide data from one Transceiver 300 to other transceivers. Information inputs from the CPU 130 may be the intended information the user of the system wishes to provide to another user or users at another distant location. The information inputs from the CPU 130 may include any type of information input by the user, and may be converted into a variety of many different types of media, for example, within the Internet of Things. The Information inputs from the CPU 130 may be provided by a computing device or other electronic device capable of performing the methodologies described herein.

The computing device providing the Information inputs may have one or more of the following: a system interface, a user interface, a CPU, a system bus, a memory connected to and accessible by other portions of controller through system bus, and hardware entities connected to the system bus. At least some of the hardware entities perform actions involving access to and use of memory, which can be a random access memory (RAM), a disk driver and/or a compact disc read only memory (CD-ROM). Some or all of the components of the computing device can be implemented as hardware, software, and/or a combination of hardware and software. The hardware may include, but is not limited to, an electronic circuit. The CPU 130 may include more, less, or different components than those illustrated in FIGS. 1 and 5. However, the components shown are sufficient to implement methodologies described herein. Hardware entities can include one or more microprocessors, application specific integrated circuits (ASICs), and other hardware. In this regard, it should be understood that a microprocessor can access and run various software applications installed on the CPU 130. The hardware entities can include a disk drive unit including a non-transitory computer-readable storage medium, which may store one or more sets of instructions (e.g., software code or code sections) to implement one or more of the methodologies, procedures, or functions described herein. The instructions can also reside, completely or at least partially, within the memory and/or within the CPU 130. The memory and the CPU 130 also can constitute machine-readable media. The term "machine-readable media", as used herein, may refer to a single medium or multiple media (e.g., a centralized or distributed database, and/or associated caches and controllers) that store the one or more sets of instructions. The term "machine-readable media", as used here, can also refer to any medium that is capable of storing, encoding or carrying a set of instructions for execution by the one or more processors and that cause the one or more processors to perform any one or more of the methodologies of the present disclosure.

In some embodiments, RF Synthesizer 140 may provide a stable RF source. The RF generated by the RF Synthesizer 140 may produce frequencies ranging from 1 MHz-10 MHz.

In some embodiments, High-Power RF Amplifier 160 may increase the power of the electromagnetic energy provided from the Power Generator 120, by increasing the amplitude of the voltage or current signal.

In some embodiments, Transmitting Antenna 170 may transmit a circularly polarized RF signal at a frequency ranging from 1 MHz-5 MHz at a power of 1 MW-5 MW with a minimum gain of 20 dB into the atmosphere to produce an High-Frequency Ionized Lines/High-Frequency Plasma Lines (HFIL/HFPL) Region 200 at an altitude of 150 km-350 km. Transmitting a circular polarized signal may ensure that power is efficiently expended for the purpose of maintaining a 0.2V/m E-Field strength.

In various embodiments, the HFIL/HFPL Controller 400 (HF Pump Controller 400) can enable the HFIL/HFPL Region 200 to be maintained at a consistent altitude and E-Field strength of 0.2V/m at all times to ensure that communications remain reliable. In some embodiments, HF Pump Controller 400 enables the HF Pump 100 to maintain an HFIL/HFPL Region at a consistent altitude ranging from 150-350 Km as established by the user, at a 0.2V/m E-Field strength, and allows the HF Pump 100 to be appropriately adjusted in power and frequency to maintain the altitude and E-Field strength values. The HF Pump Controller 400 may include sub-components, such as Receiver 410, RF Synthesizer 420, RF Amplifier 430, and Transmitting Antenna 440.

In some embodiments, Receiver 410 may allow for an incoming RF signal to be received. For example, the Receiver 410 may receive, at a Receive Strength Level of −50 dB to 20 dB, a transmitted frequency, ranging from 100 MHz-500 MHz, from the Transmitting Antenna 440.

In some embodiments, RF Synthesizer 420 may provide a stable RF signal source to be transmitted through the Transmitting Antenna 440.

In some embodiments, RF Amplifier 430 may be used to produce power needed to push a transmission signal, ranging from 100 MHz-500 MHz, through the Transmitting Antenna 440 and into the atmosphere. The transmitted RF signal may be directed towards the HFIL/HFPL Region 200.

In some embodiments, Transmitting Antenna 440 may transmit one or more RF signals at a frequency ranging from 100 MHz-500 MHz into the atmosphere. The one or more of the transmitted RF signals may be directed at the HFIL/

HFPL Region 200. In some embodiments, HFIL/HFPL Region 200 is an area of the atmosphere at an altitude of 150 km-350 km The HFIL/HFPL Region 200 may be maintained at an E-Field strength value of 0.2V/m in order to produce an area for incoming RF signals to be isotropically repeated and received at any location within line-of-sight of the HFIL/HFPL Region 200. Powerful HF electromagnetic waves incident on the ionosphere can create and maintain a region that scatters UHF waves over a wide area. In some embodiments, to create a region in the ionosphere that scatters UHF waves by one or more orders of magnitude greater than the unmodified natural ionosphere, the transmission of O-mode circularly polarized HF waves that have a free space root mean squared (RMS) electric field strength may equal a threshold value $\langle |E| \rangle \approx E_r$ near the wave vertical reflection height, at an altitude r, in which the HF wave (referred to here as the pump wave) frequency $f_0$ equals the ionosphere plasma frequency, $\omega_{pe}$:

$$f_0 = \omega_{pe}(r, t) = \sqrt{\frac{n_e(r, t) q_e^2}{m_e \varepsilon_0}} .\qquad (1.1)$$

$n_e$ is the electron volume number density which generally varies with position and time t, $q_e$ is the electron charge, $m_e$ is the effective electron mass, and $\varepsilon_0$ is the permittivity of free space. In geophysical settings, $\omega_{pe}$ is a function of electron number density alone and may vary between 2 MHz and 15 MHz depending on location, time of day, season, and solar cycle. The electric field strength of a pump wave transmitted vertically from the ground can be calculated from the Poynting flux $S = E \times B/\mu_0$, in which B is the magnetic field and $\mu_0$ is the permeability of free space. Since $E \perp B$, $|B|=|E|/c$, and $c=1/\sqrt{\mu_0 \varepsilon_0}$, in which c is the speed of light in a vacuum, the magnitude of the Poynting flux may be:

$$|S| = \sqrt{\frac{\varepsilon_0}{\mu_0}} |E|^2 .\qquad (1.2)$$

The magnitude of the Poynting flux of a pump wave propagating vertically from the ground may decrease as the inverse of the altitude above the transmitter is squared, i.e. as $1/r^2$. At the center of the transmitter pump wave beam, the Poynting flux can be nominally equal to the net power of the transmitter, P, multiplied by the antenna gain, G, divided by the surface area of a sphere with radius r:

$$|S| = \frac{PG}{4\pi r^2} .\qquad (1.3)$$

The product PG is also called the effective radiated power (ERP) of the transmitter. Equating (1.2) and (1.3) yields an expression:

$$PG = 4\pi r^2 \sqrt{\frac{\varepsilon_0}{\mu_0}} |E|^2 .\qquad (1.4),$$

for the pump-wave transmitter ERP necessary to achieve a given peak electric field magnitude at a given altitude directly above the transmitter. The electric field threshold necessary to maximize the UHF ionosphere plasma scattering region that satisfies an RMS threshold, $$E_t^2 = \langle |E|^2 \rangle_t$$

is substituted into (1.4) to arrive at the expression:

$$(PG)_t = 4\pi r^2 \sqrt{\frac{\varepsilon_0}{\mu_0}} E_t^2 .\qquad (1.5),$$

which describes the minimum necessary pump-wave transmitter net power and antenna gain to achieve an RMS electric field threshold $E_t$ at altitude r. The reflective region, i.e., the HFIL/HFPL region, may typically be maintained at altitudes ranging from 150 km≤r≤350 km, in which the E-Field strength $E_t \approx 0.2$ V/m. A minimum pump-wave transmitter ERP necessary to maximize the UHF scattering effect in a region at the maximum expected altitude, in which r=350 km, is:

$$(PG)_{0.2\ V/M} = 200\ \text{MW} \qquad (1.6)$$

In various embodiments, a pump transmitter with an ERP larger than the minimum pump-wave transmitter ERP, for example 200 MW, may accommodate unfavorable space weather conditions, such as enhanced D-region ionosphere HF absorption during solar flares and other geomagnetic phenomena. In other embodiments, pump transmitters with ERPs less than the minimum pump-wave transmitter ERP, for example 200 MW, can still demonstrate the technique under more constrained conditions such as lowering the maximum altitude of the relay region or reducing the intensity of reflections from the relay region. The pump transmitter effective radiated power threshold (1.6) may be achieved through a combination of net transmitted power and antenna gain. Maximizing the antenna gain may be generally desirable because focusing the pump beam decreases the transmitter pump net power required to achieve the necessary electric field threshold which in turn decreases, nearly linearly, the rate of energy consumption required to maintain the pump beam. Increasing antenna gain for a particular radio frequency, while maintaining peak efficiency, simultaneously increases the minimum antenna aperture size, according to:

$$G = \frac{4\pi A_{phys}}{\lambda^2} \frac{A_{phys}}{A_{eff}} .\qquad (1.7)$$

The ratio of antenna physical aperture $A_{phys}$ to effective aperture $A_{eff}$ is the antenna efficiency and $\lambda$ is the wavelength of the transmitted electromagnetic wave. In situations in which the pump transmitter is capable of 1 MW net power, which is within the typical capability of top-end and highly efficient commercial broadcast transmitters (Power efficiencies of up to 90% can be expected), an antenna gain (G=200) is required by (1.6). Assume the antenna efficiency is unity and the chosen wavelength is $\lambda$=100 m, a radio frequency of 3 MHz, which is near the lower end of the pump frequency band, can maintain an ionosphere plasma relay region at all hours. By (1.7), a physical antenna aperture area of $A_{phys}=2 \times 10^5$ m²=50 Acres (e.g., a square aperture 400 m per side) may achieve the threshold ERP.

Figure 5:
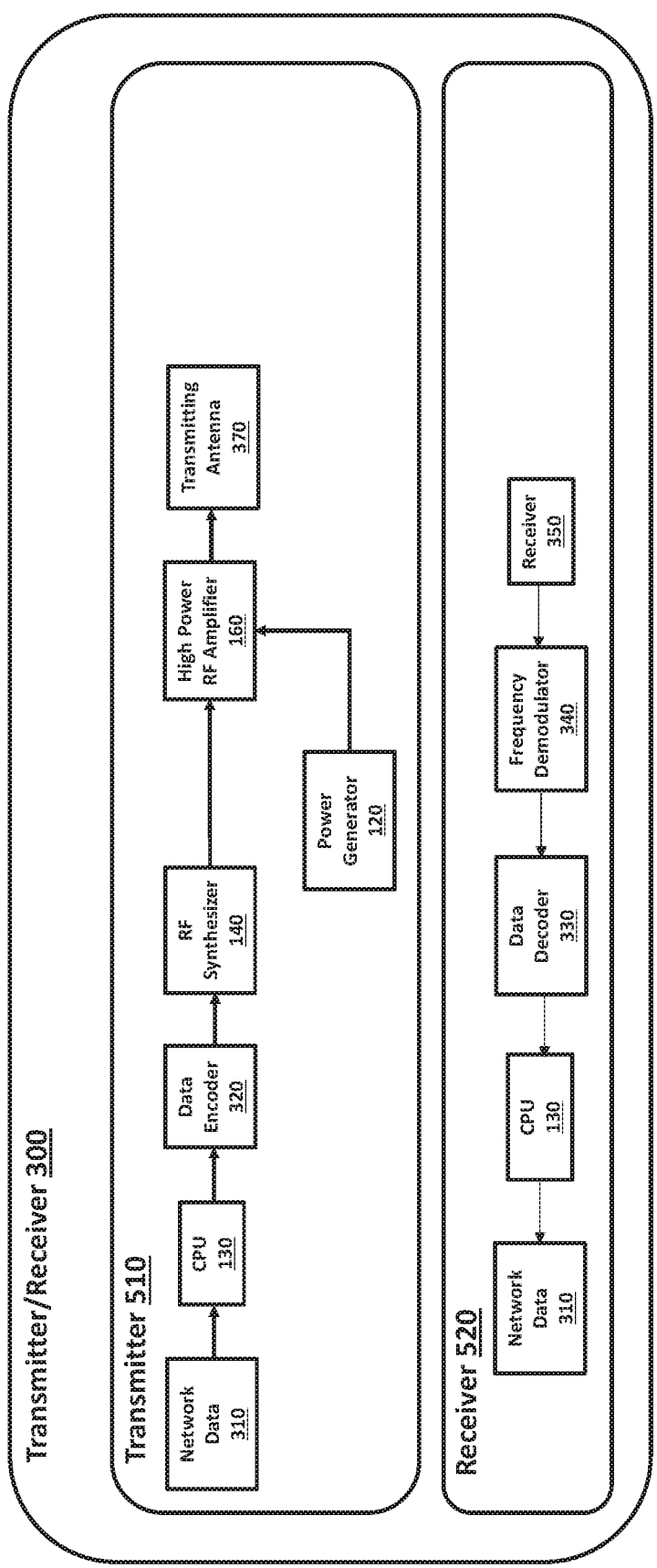
FIG. 5 is a diagram of a transmitter/receiver (transceiver) configuration.

Referring to FIG. 5, in some embodiments, Transmitter/Receiver (hereinafter "Transceiver") 300 transmits one or more RF signals ranging from 100 MHz to 20 GHz into the atmosphere towards the HFIL/HFPL Region 200 created by the HF Pump 100 at an altitude of 150 km-350 km. The one or more RF signals may be maintained at an E-Field strength of 0.2V/m. The Transceiver 300 may include at least two sub-components: Transmitter 510 and Receiver 520. Each sub-component may include their own sub-components. It should be recognized that sub-components of FIG. 5, having the same reference numbers as the components of FIG. 1, may include the same features as previously discussed.

In some embodiments, the Transmitter 510 may include: Network Data 310, CPU 130, Data Encoder 320, RF Synthesizer 140, High-Power RF Amplifier 160, Power Generator 120, and Transmitting Antenna 370.

In some embodiments, Network Data 310 may be data to be transmitted from one location to one or more other locations.

CPU 130 may include one or more processors and non-transitory computer-readable memory. The memory may contain programming instructions in the form of a software application that, when executed by the processor, causes the device to perform one or more signal processing operations according to the programming instructions. The CPU 130 may provide data either for the HF Pump 100, in order to provide control for the maintaining of the 0.2V/m E-Field strength or to a Transceiver 300, in order to provide data from one Transceiver 300 to other transceivers. Information inputs from the CPU 130 may be the intended information the user of the system wishes to provide to another user or users at another distant location. The information inputs from the CPU 130 may include any type of information input by the user, and may be converted into a variety of many different types of media, for example, within the Internet of Things. The Information inputs from the CPU 130 may be provided by a computing device or other electronic device capable of performing the methodologies described herein.

The computing device providing the Information inputs may have one or more of the following: a system interface, a user interface, a CPU, a system bus, a memory connected to and accessible by other portions of controller through system bus, and hardware entities connected to the system bus. At least some of the hardware entities perform actions involving access to and use of memory, which can be a random access memory (RAM), a disk driver and/or a compact disc read only memory (CD-ROM). Some or all of the components of the computing device can be implemented as hardware, software and/or a combination of hardware and software. The hardware may include, but is not limited to, an electronic circuit. The CPU 130 may include more, less or different components than those illustrated in FIGS. 1 and 5. However, the components shown are sufficient to implement methodologies described herein. Hardware entities can include one or more microprocessors, application specific integrated circuits (ASICs) and other hardware. In this regard, it should be understood that a microprocessor can access and run various software applications installed on the CPU 130. The hardware entities can include a disk drive unit including a non-transitory computer-readable storage medium, which may store one or more sets of instructions (e.g., software code or code sections) to implement one or more of the methodologies, procedures, or functions described herein. The instructions can also reside, completely or at least partially, within the memory and/or within the CPU 130. The memory and the CPU 130 also can constitute machine-readable media. The term "machine-readable media", as used herein, may refer to a single medium or multiple media (e.g., a centralized or distributed database, and/or associated caches and controllers) that store the one or more sets of instructions. The term "machine-readable media", as used here, can also refer to any medium that is capable of storing, encoding or carrying a set of instructions for execution by the one or more processors and that cause the one or more processors to perform any one or more of the methodologies of the present disclosure.

In some embodiments, Data Encoder 320 may convert the Information inputs from the CPU 130 into a format capable of being modulated for data transmission. Modulation may be achieved in a range of ways, for example, including, but not limited to, on/off keying, Quadrature Phase Shift Keying (QPSK), and Binary Phase Shift Keying (BPSK).

In some embodiments, RF Synthesizer 140 may provide a stable RF source. The RF generated by the RF Synthesizer 140 may produce frequencies ranging from 1 MHz-10 MHz.

In some embodiments, High-Power RF Amplifier 160 can increase the power of the electromagnetic energy provided from the Power Generator 120, by increasing the amplitude of the voltage or current signal.

In some embodiments, Transmitting Antenna 370 may transmit RF energy. The RF energy may be vertically, horizontally, or circularly polarized and consist of a transmitting frequency ranging from 100 MHz to 20 GHz at a power ranging from 1 KW-500 KW, at 20 dB or higher. In some embodiments, Transceiver Transmissions may be a RF transmission directed towards the HFIL/HFPL Region 200. In some embodiments, the transmissions may impact the HFIL/HFPL Region 200 in order to be isotropically repeated to another transceiver or other transceivers.

In some embodiments, the Receiver 520 may include sub-components, such as, Data Network Data 310, CPU 130, Data Decoder 330, Frequency Demodulator 340, and Receiver 350.

In some embodiments, Network Data 310 may be data intended to be transmitted from one location to one or more other locations.

CPU 130 may include one or more processors and non-transitory computer-readable memory. The memory may contain programming instructions in the form of a software application that, when executed by the processor, causes the device to perform one or more signal processing operations according to the programming instructions. The CPU 130 may provide data either for the HF Pump 100, in order to provide control for the maintaining of the 0.2V/m E-Field strength, or to a Transceiver 300, in order to provide data from one Transceiver 300 to other transceivers. Information inputs from the CPU 130 may be the intended information the user of the system wishes to provide to another user or users at another distant location. The information inputs from the CPU 130 may include any type of information input by the user, and may be converted into a variety of many different types of media, for example, within the Internet of Things. The Information inputs from the CPU 130 may be provided by a computing device or other electronic device capable of performing the methodologies described herein.

The computing device providing the Information inputs may have one or more of the following: a system interface, a user interface, a CPU, a system bus, a memory connected to and accessible by other portions of controller through system bus, and hardware entities connected to the system bus. At least some of the hardware entities perform actions involving access to and use of memory, which can be a random access memory (RAM), a disk driver and/or a compact disc read only memory (CD-ROM). Some or all of the components of the computing device can be implemented as hardware, software, and/or a combination of hardware and software. The hardware may include, but is not limited to, an electronic circuit. The CPU 130 may include more, less, or different components than those illustrated in FIGS. 1 and 5. However, the components shown are sufficient to implement methodologies described herein. Hardware entities can include one or more microprocessors, application specific integrated circuits (ASICs), and other hardware. In this regard, it should be understood that a microprocessor can access and run various software applications installed on the CPU 130. The hardware entities can include a disk drive unit including a non-transitory computer-readable storage medium, which may store one or more sets of instructions (e.g., software code or code sections) to implement one or more of the methodologies, procedures, or functions described herein. The instructions can also reside, completely or at least partially, within the memory and/or within the CPU 130. The memory and the CPU 130 also can constitute machine-readable media. The term "machine-readable media", as used herein, may refer to a single medium or multiple media (e.g., a centralized or distributed database, and/or associated caches and controllers) that store the one or more sets of instructions. The term "machine-readable media", as used here, can also refer to any medium that is capable of storing, encoding or carrying a set of instructions for execution by the one or more processors and that cause the one or more processors to perform any one or more of the methodologies of the present disclosure.

In some embodiments, Data Decoder 330 can strip data from a RF transmission and convert the transmission to a format where the transmission can be interpreted as Data. For example, subsequent to the RF transmission being demodulated, the demodulated RF transmission passes through a data decrypter, such as Data Decoder 330, in order to decrypt the information within the RF transmission, prior to the CPU 130 receiving the information. In other embodiments, stripping data from an RF transmission may be eliminated. In yet other embodiments, stripping data from an RF transmission may be a necessary requirement for Government customers and/or international government customers.

In some embodiments, Frequency Demodulator 340 may receive RF signals and prepare the RF signals for data extraction. As RF signals may be difficult to interpret due to multipath or atmospheric complications, in some embodiments, the Frequency Demodulator 340 may demodulate the RF signals through Space, Angle, Frequency, or Polarization diversity.

In some embodiments, Receiver 350 may receive RF signals from another distant location. In some embodiments, a HFIL/HFPL Repeated Transmission Propagation Pattern 360 is one or more RF signals containing data that has been received from another or other distant Transceivers.

Returning to FIG. 1, FIG. 1 depicts the equipment string of HF Pump 100 and HF Pump Controller 400. In various embodiments, with the CPU 130 of the HF Pump 100 may deliver user specified information to the RF Synthesizer 140. The user selects the altitude of the HFIL/HFPL Region 200, and the CPU 130 passes the data of the altitude settings of the HFIL/HFPL Region to the RF Synthesizer 140 to determine RF signal levels. The RF Synthesizer 140 selects a RF level to be used for transmission to another transceiver.

From the RF Synthesizer 140, the High-Power RF Amplifier 160 receives the one or more RF signals from the RF Synthesizer 140. Power Generator 120 provides power to the High-Power RF Amplifier 160 as required to maintain the altitude determined by the user of the HFIL/HFPL Region 200. The one or more RF signals can be transmitted to the Transmitting Antenna 170. From the Transmitting Antenna 370, the one or more RF signals are transmitted out of the Transceiver 300. The transmission of the RF signal from the HF Pump 100 creates the HFIL/HFPL Region 200, such that incoming Transceiver transmissions can be isotropically repeated to other Transceivers 300. In various embodiments, the HF Pump Controller 400 may maintain the HFIL/HFPL Region 200 characteristics through ever-changing atmospheric fluctuations impacting it.

In some embodiments, the RF Synthesizer 420 of the HF Pump Controller 400 receives data from the CPU 130 residing with the HF Pump 100, in order to make adjustments for optimal sampling of the HFIL/HFPL Region 200. The one or more RF signals from the RF Synthesizer 420 is received by the High-Frequency Amplifier 430, where the one or more RF signals are boosted in power by the Power Generator 120. In some embodiments, with sufficiently powered RF signals, the Transmitting Antenna 440 transmits the one or more RF signals into the atmosphere. With the intent of impacting the HFIL/HFPL Region 200, the Transmitting Antenna 440 transmits the one or more RF signals in order to sample the RF signals and determine if adjustments are required to maintain the HFIL/HFPL Region 200. Upon impact of the HFIL/HFPL Region by the transmitted RF from the Transmitting Antenna 440, the RF returns to its origin and is received by the Receiver 410. The RF data is provided to the CPU 130 for analysis. At the CPU 130, the data is used to make further adjustments to the frequency and power of the RF transmitted by the HF Pump 100, in order to ensure HFIL/HFPL Region 200 is consistently maintained.

Figure 2:
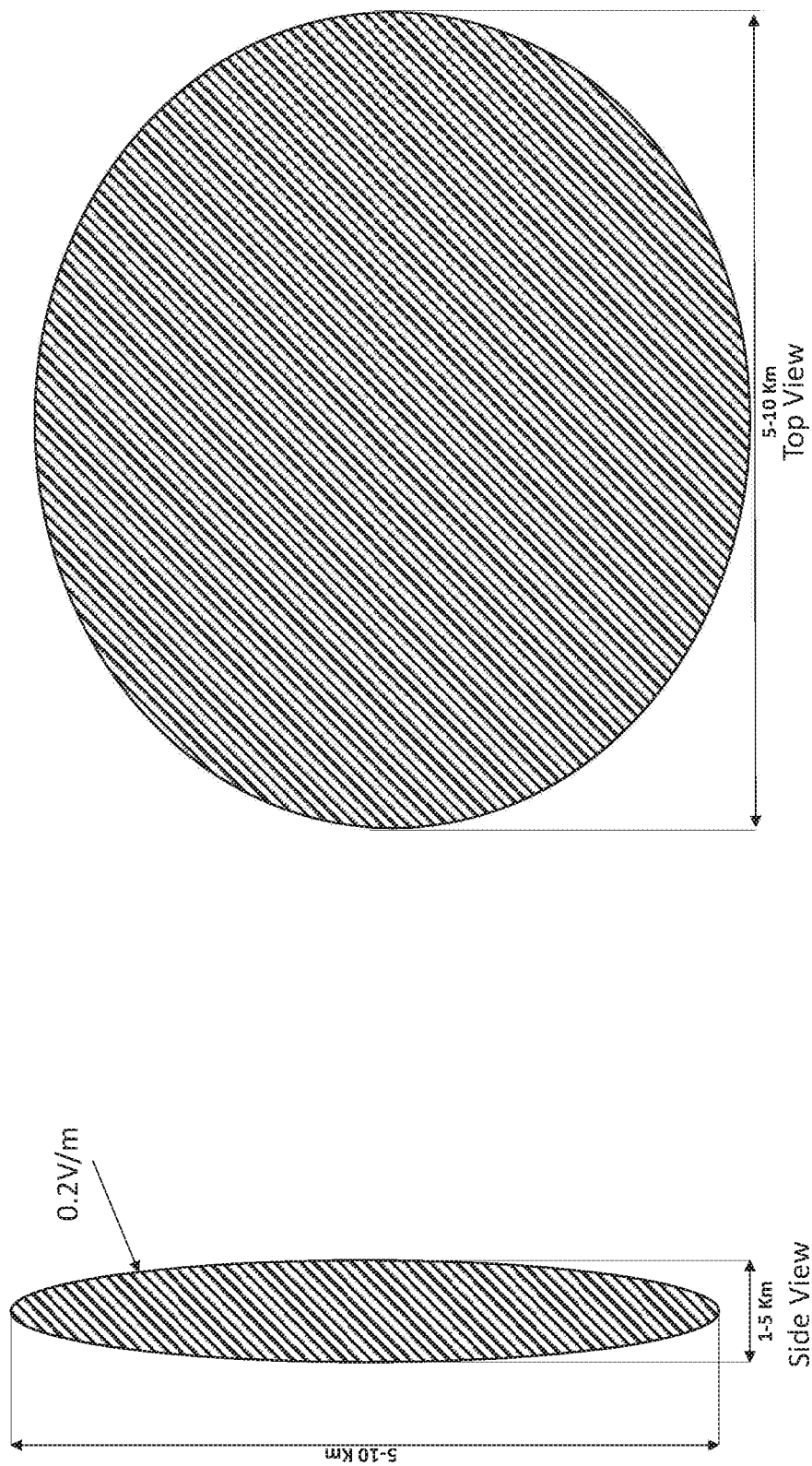
FIG. 2 illustrates a HFIL/HFPL region configuration.

In some embodiments, FIG. 2 illustrates a structure of a HFIL/HFPL Region 200. The HF Pump 100 creates and maintains the HFIL/HFPL Region 200. The HFIL/HFPL Region 200 may be approximately 1 km-5 km in height and 5 km-10 km in diameter, taking a shape similar to a 'pancake'. Moreover, the HF Pump 100 creates the HFIL/HFPL Region 200 by applying an E-Field strength of 0.2V/m. The E-Field strength may allow for the HFIL/HFPL Region 200 to be created. Additionally, the E-Field strength is the optimal level for ensuring that incoming Transceiver Transmissions may be isotropically repeated at approximately 4 MHz higher than their originating frequency to other distant Transceiver(s) 300.

Figure 3:
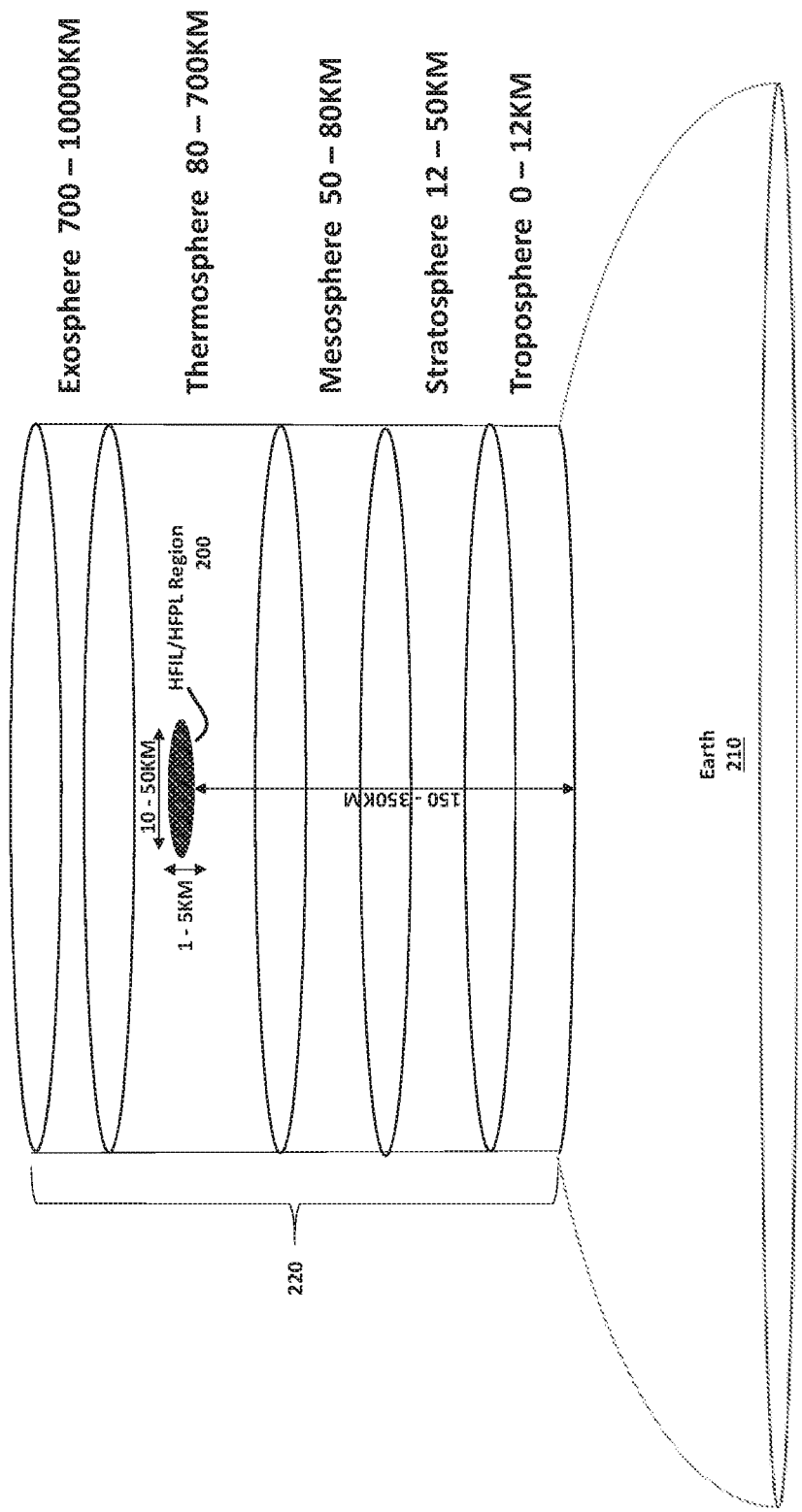
FIG. 3 depicts the altitude of the HFIL/HFPL region.

In some embodiments, FIG. 3 illustrates where the HFIL/HFPL Region 200 resides in the atmosphere. In some embodiments, the HFIL/HFPL Region 200 resides at an altitude of 150 km-350 km within the Thermosphere of the atmospheric layers 220. It is noted that the atmospheric layers 220 and the Earth 210 are provided as a frame of reference to further understand the HFIL/HFPL Region 200 in altitude above the Earth 210.

Figure 4:
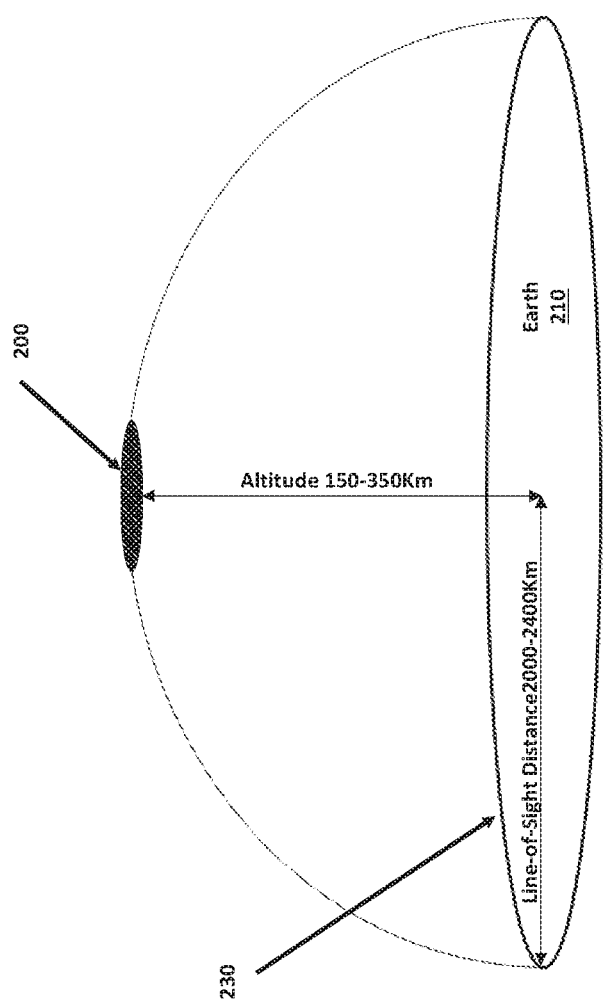
FIG. 4 depicts a line-of-sight area from the surface of the Earth to the HFIL/HFPL region.

FIG. 4 depicts a 3-dimensional diagram of line-of-sight distance from ground to HFIL/HFPL Region 200. In some embodiments, the HFIL/HFPL Coverage Area 230 has a radius of 2000 km-4800 km on the Earth 210. The HFIL/HFPL Coverage Area 230 provides a coverage area in which Transceivers 300 can be located and still communicate with one another.

FIG. 5 depicts a Transceiver 300. In some embodiments, the Transceiver 300 transmits data and receives data. In some embodiments, Network Data 310 is provided to the Transmitter 510 of the Transceiver 300, and in particular, is provided to the CPU 130. The CPU 130 passes the Network Data 310 to the Data Encoder 320, which converts the Network Data 310 to a format capable of being transmitted in a RF signal. The Data Encoder 320 sends the Network Data 310 to the RF Synthesizer 140, where the Network Data 310 is prepared to be transmitted as an RF signal. The RF Synthesizer 140 passes the Network Data 310 to the High-Power RF Amplifier 160. The Power Generator provides power to the RF Synthesizer 140. With the RF signal encoded with Network Data 310 and sufficiently powered by the High-Power RF Amplifier 160, the RF signal can be sent to the Transmitting Antenna 370. In some embodiments, the Transmitting Antenna 370 may transmit the RF signal as a Transceiver Transmission. The Transmitter/Receiver Transmission may have a frequency of 100 MHz to 20 GHz, 1 KW-1000 KW, 20 dB+. The frequency of the Transceiver Transmission may also have a horizontal, vertical, or circular polarization. Further, a modulation of the frequency may include, but is not limited to, Quadrature Phase Shift Keying, Binary Phase Shift Keying, or On/Off keying. In some embodiments, the Transceiver Transmission may impact the HFIL/HFPL Region 200 and become isotropically repeated at a new frequency of approximately 4 MHz higher than its origination to be received by another Transceivers.

Figure 6:
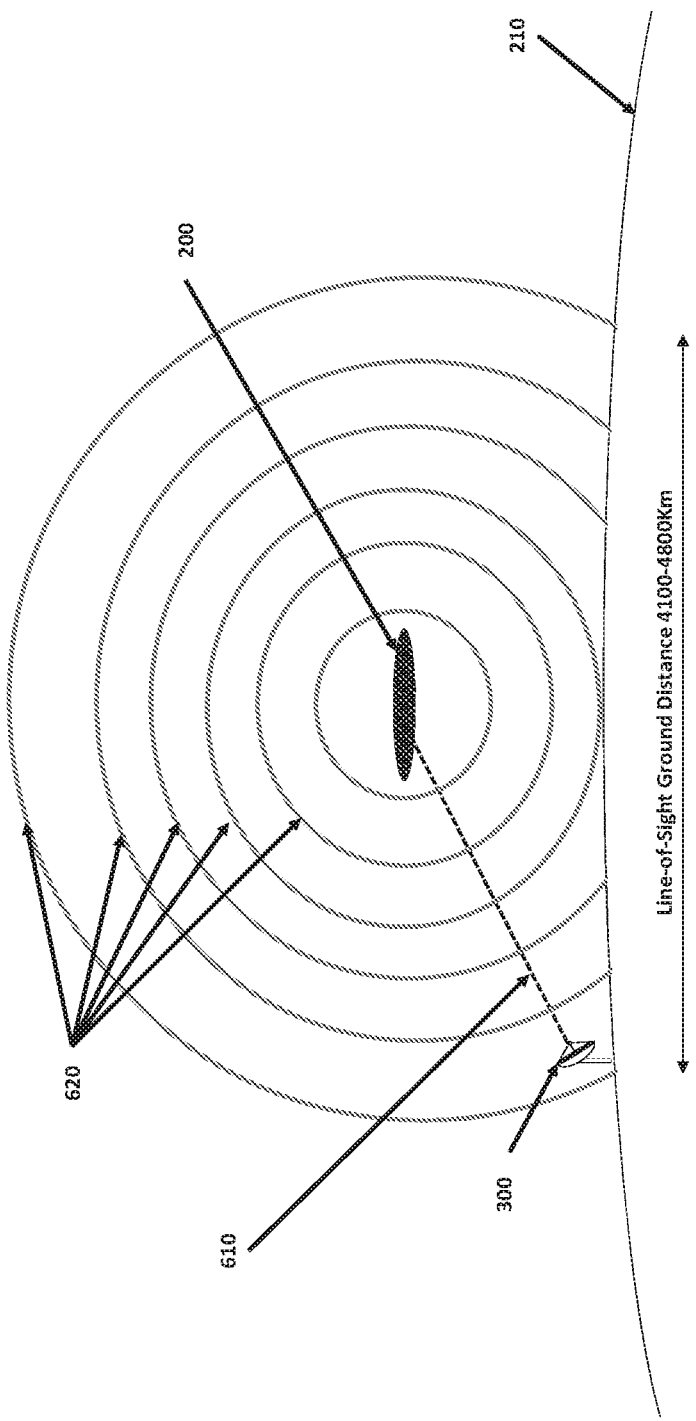
FIG. 6 illustrates a side view of the propagation pattern of a repeated transmission from a transmitter located within line-of-sight of an HFIL/HFPL region.

FIG. 6 illustrates a side view of an isotropically repeated Transceiver Transmission, originating from a Transceiver 300. In some embodiments, the Transceiver Transmission impacts the HFIL/HFPL Region 200 and is isotropically repeated at a new frequency approximately 4 MHz higher than it originated as. In some embodiments, any other line-of-sight Transceivers 300 within the HFIL/HFPL Region Coverage Area 230 can receive the HFIL/HFPL Repeated Transmission Propagation Pattern 320 can be received by, in which the coverage area 230 may be 4100 km-4800 km in diameter from the HFIL/HFPL Region 200.

Figure 7:
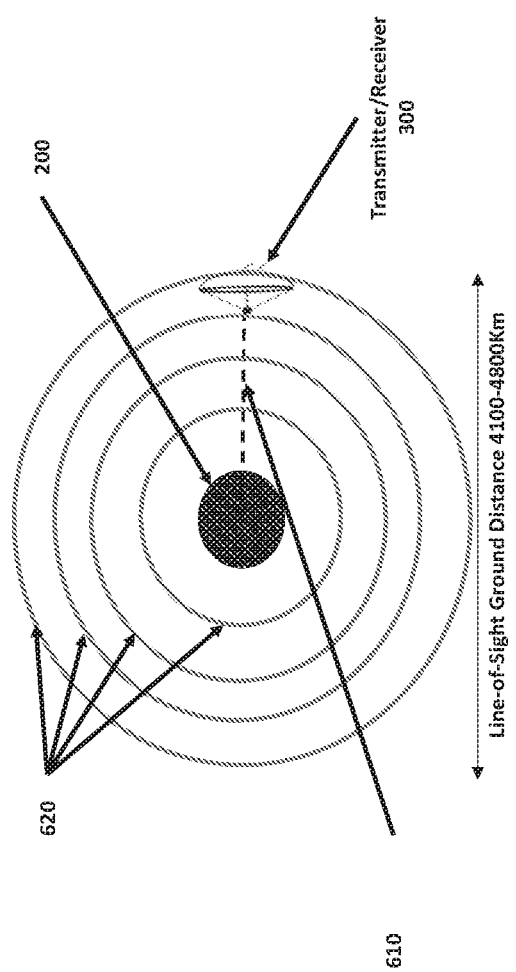
FIG. 7 illustrates a top view of the propagation pattern of a repeated transmission from a transmitter located within line-of-sight of a HFIL/HFPL region.

FIG. 7 illustrates a top view of the line-of-sight HFIL/HFPL Repeated Transmission Propagation Pattern 620. In some embodiments, the line-of-sight HFIL/HFPL Repeated Transmission Propagation Pattern 620 may range from 4100 km-4800 km from the point of origin of the HFIL/HFPL Region 200. In some embodiments, the Transceiver Transmission impacts the HFIL/HFPL Region 200, and is isotropically repeated at a new frequency approximately 4 MHz higher than the original frequency. In some embodiments, the HFIL/HFPL Repeated Transmission Propagation Pattern 620 may be received by any other line-of-sight Transceiver 300 within the HFIL/HFPL Region Coverage Area 230 determined to be 4100 km-4800 km in diameter from the HFIL/HFPL Region 200.

Figure 8:
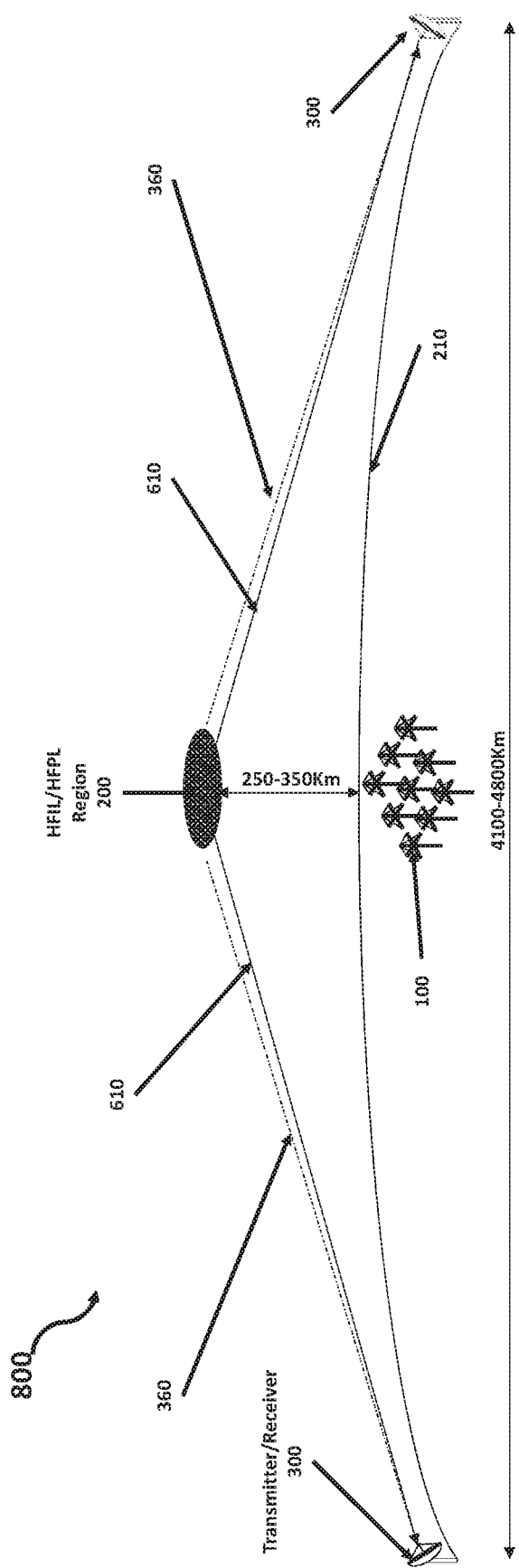
FIG. 8 illustrates a network broadcast system.

FIG. 8 illustrates a side view of a Broadcast Network System 800. In some embodiments, the HF pump 100 creates a HFIL/HFPL Region 200. The Transceivers 300 participating in the Broadcast Network System 800 may transmit their Transceiver Transmissions. The Transceivers 300 may transmit Transceiver Transmissions at different frequencies, so as not to interfere with each other's transmissions. To impact the HFIL/HFPL Region 200, the frequencies of the Transceiver Transmissions may range from 100 MHz to 20 GHz. The Transceiver Transmissions 610 are isotropically repeated at 4 MHz higher than they originated, in which the Transceiver Transmissions are converted to Transceiver Repeated Transmission Propagation Patterns 360. The Transceiver Repeated Transmission Propagation Patterns 360 may be received by other Transceiver(s) participating in the Broadcast Network System 800. While only two Transceivers 300 are shown for simplicity, many Transceivers 300 may participate in the network, as will be described later. In some embodiments, the Transceiver Repeated Transmission Propagation Patterns 360 may propagate within line-of-sight of the HFIL/HFPL Region 200 to distances up to 4100 km-4800 km, based on the altitude of the HFIL/HFPL Region 200 which may be between 150 km-350 km in altitude above the Earth 210.

Figure 9:
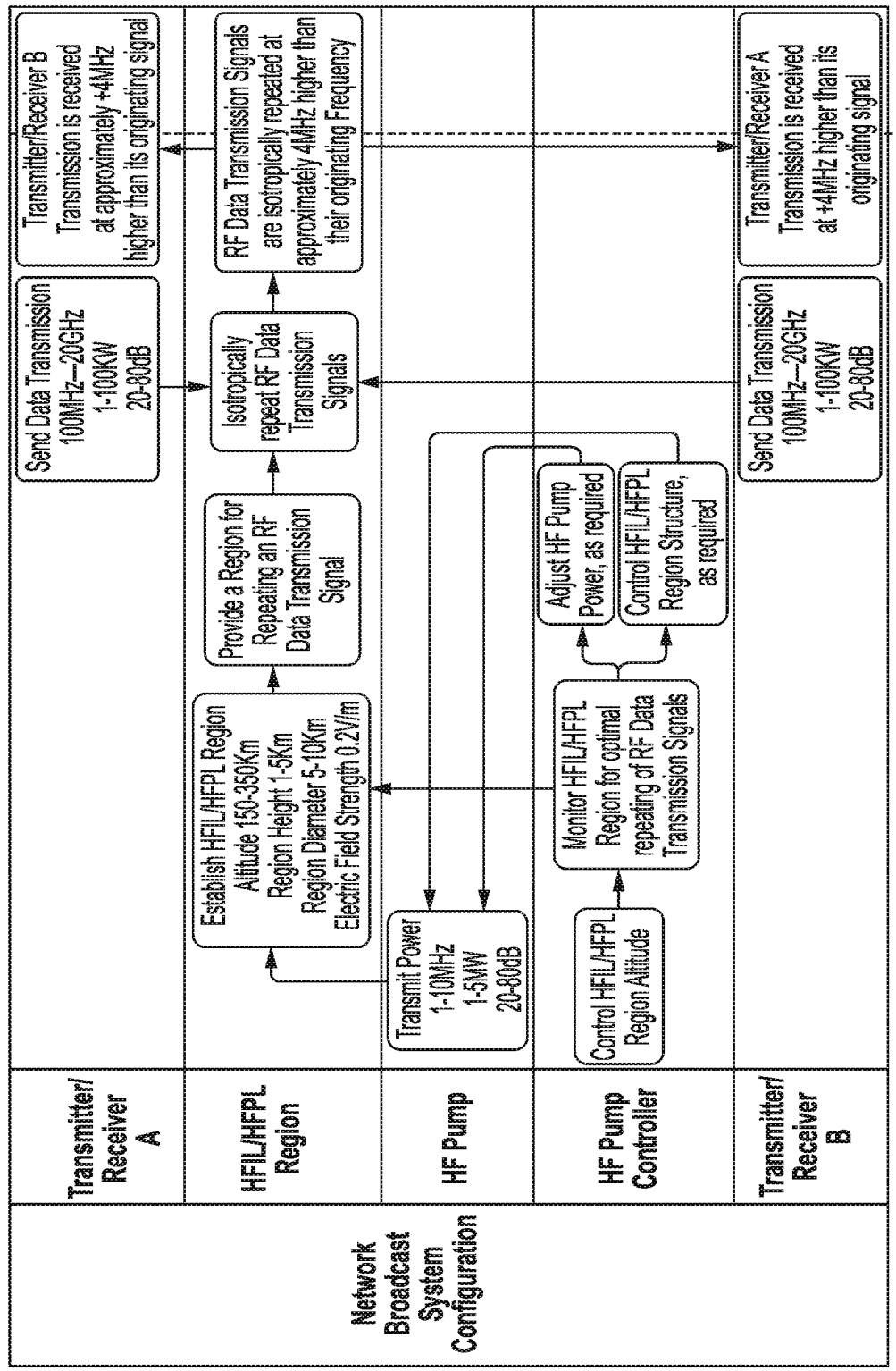
FIG. 9 is a flow chart of a network broadcast system.

FIG. 9 depicts a flow chart of the Broadcast Network System 800. The process is initiated with the activation of the HF Pump 100. The HF Pump transmits a high-frequency transmission at 1 MHz-10 MHz, 5 MW-10 MW, 20 dB+, at a circular polarization. The frequency range of the HF Pump 100 may be adjusted to allow for atmospheric fluctuations, largely related to solar impacts, enabling the HFIL/HFPL Region 200 to be controlled at a consistent altitude of 150 km-350 km, as chosen by the user. The power level of the HF Pump 100 may be 5 MW-10 MW, in order to allow for sufficient atmospheric modification to occur. In some embodiments, the power level may be adjustable to allow for altitude control of the HFIL/HFPL Region 200, due to constant and unpredictable solar influences in the Thermosphere. The HF Pump 100 gain of 20 dB+ allows for the HF Pump 100 to provide directed power for the creation of the HFIL/HFPL Region 200. Circular polarization allows for power efficiency of the HF Pump 100. In some embodiments, utilizing more power, the HFIL/HFPL Region 200 can be created with either horizontal or vertical polarization.

In some embodiments, in conjunction with the HF Pump 100, HF Pump Controller 400 can adjust both power and frequency to maintain the overall HFIL/HFPL Region 200 structure and altitude. In some embodiments, the HF Pump Controller 400 monitors the HFIL/HFPL Region 200 via a remote sensor capable of sending a transmission to the HFIL/HFPL Region 200 and receiving the transmission at the HF Pump Controller 400 location. Upon receiving the transmission at the HF Pump Controller 400, the data of the transmission received from the HFIL/HFPL Region 200 may be processed and used to determine power and frequency levels of the HF Pump 100, in order to maintain altitude and maintain HFIL/HFPL Region 200 structure. In some embodiments, the data of the transmission received from the HFIL/HFPL Region 200 may be processed and used to determine power and frequency levels of the HF Pump 100, in order to maintain altitude and maintain HFIL/HFPL Region 200 structure when impacted by solar influences.

The HF Pump 100 may create the HFIL/HFPL Region 200. In some embodiments, by maintaining an E-Field strength of 0.2V/m, HF Pump 100 creates the HFIL/HFPL Region 200. The HFIL/HFPL Region 200 can reside at an altitude of 150 km-350 km. The HFIL/HFPL Region 200 may also have a structure height of 1 km-5 km and a diameter of 5 km-10 km.

FIG. 9 illustrates a process flow involving the HFIL/HFPL Region 200. In various embodiments, the incoming Transceiver Transmissions may be isotropically repeated from the HFIL/HFPL Region 200 to generate the HFIL/HFPL Repeated Transmission Propagation Pattern 360, which may be received at other Transceiver(s) 300. In some embodiments, based on the atmospheric modification processes occurring within the HFIL/HFPL Region 200, the incoming Transceiver Transmissions may be isotropically repeated from the HFIL/HFPL Region 200 at approximately 4 MHz higher than which the Transmitter/Receiver Transmissions originated.

Finally, in the FIG. 9 process flow involves the Transceiver(s) 300. In various embodiments, the Transceiver Transmission 610 may range from 100 MHz to 20 GHz based on user spectrum requirements, as well as data and environmental fading effects, as determined by the user. In some embodiments, the power level of a Transceiver 300 may be between 1 KW-100 KW and have a gain of 20-80 dB. Moreover, the data modulation may consist of, but is not limited, to QPSK, BPSK, and On/Off Keying. In some embodiments, the polarization of the Transceiver Transmission 310 may be horizontal, vertical, or circular, as determined by preference of the user. As the Transceiver Transmission 610 enters the HFIL/HFPL Region 200, it is isotropically repeated from the HFIL/HFPL Region 200 at approximately 4 MHz higher than the transmission originated as. In some embodiments, one or more Transceiver(s) 300 at another location(s), within line-of-sight of the HFIL/HFPL Region 200, can receive the HFIL/HFPL Repeated Transmission Propagation Pattern 360.

Figure 10:
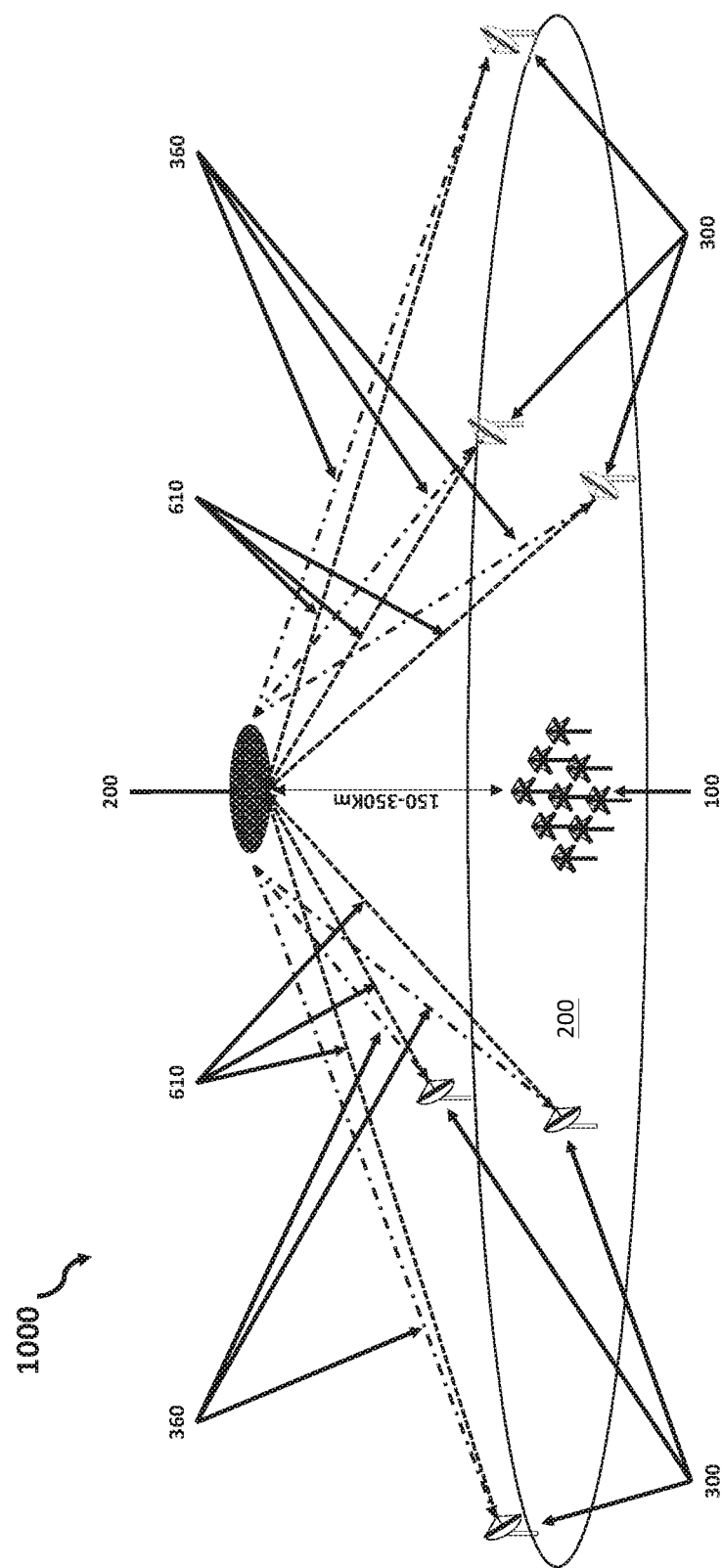
FIG. 10 depicts a network broadcast system that includes multiple transceivers.

FIG. 10 illustrates a Multi-Point Broadcast Network System Configuration 1000. Similar to the Transceiver 300 of FIGS. 8 and 9, in some embodiments, multiple Transceivers 300, operating within line-of-sight of the HFIL/HFPL Region 200, may participate as a network. In other various embodiments, the multiple transceivers 300 of FIG. 10 may participate as a network, as long as the locations of the Transceivers 300 are located within line-of-sight of the HFIL/HFPL Region 200. The process for the Broadcast Network System 1000 of FIG. 10 is similar to the Broadcast Network System FIGS. 8 and 9. To ensure that Electromagnetic (EM) interference is not caused, the users participating in the network may diversify the frequencies used for the multiple transceivers 300. The system in FIG. 10 may also account for the approximate 4 MHz+ change in HFIL/HFPL Repeated Transmission Propagation Pattern 360.

Figure 11:
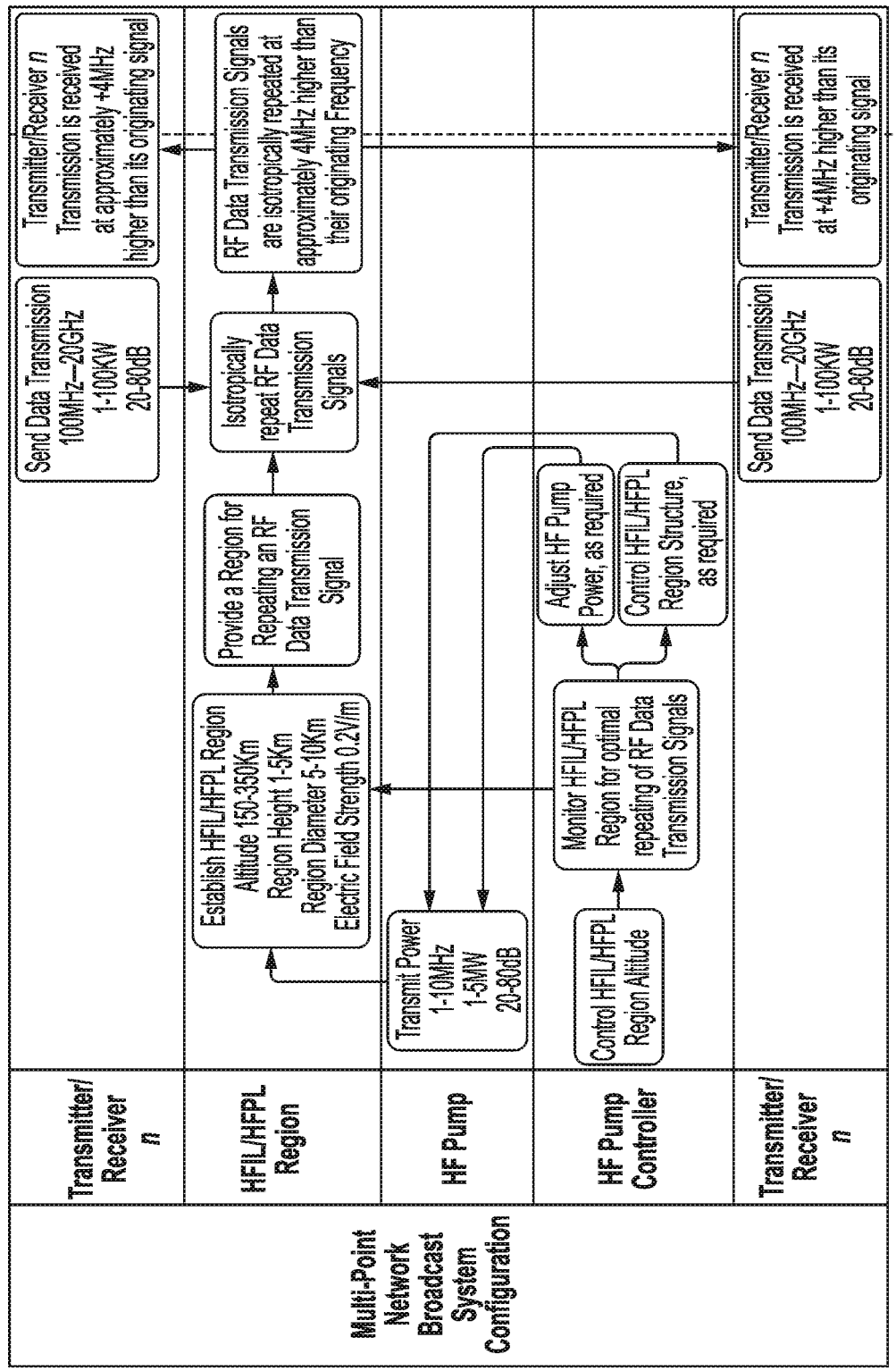
FIG. 11 is a flow chart of a network broadcast system that includes multiple transceivers.

FIG. 11 illustrates a process flow for a Multi-Point Broadcast Network System. The flow of FIG. 11 differs from the flow of FIG. 9 in that multiple Transceivers 300 may participate within line-of-sight of the HFIL/HFPL Region 200. In some embodiments, the process flow of FIG. 10 may maintain frequency diversity across the network to avoid EM interference, and account for the HFIL/HFPL Repeated Transmission Propagation Pattern 360 being approximately 4 MHz higher than the original frequency of the pattern.

Figure 12:
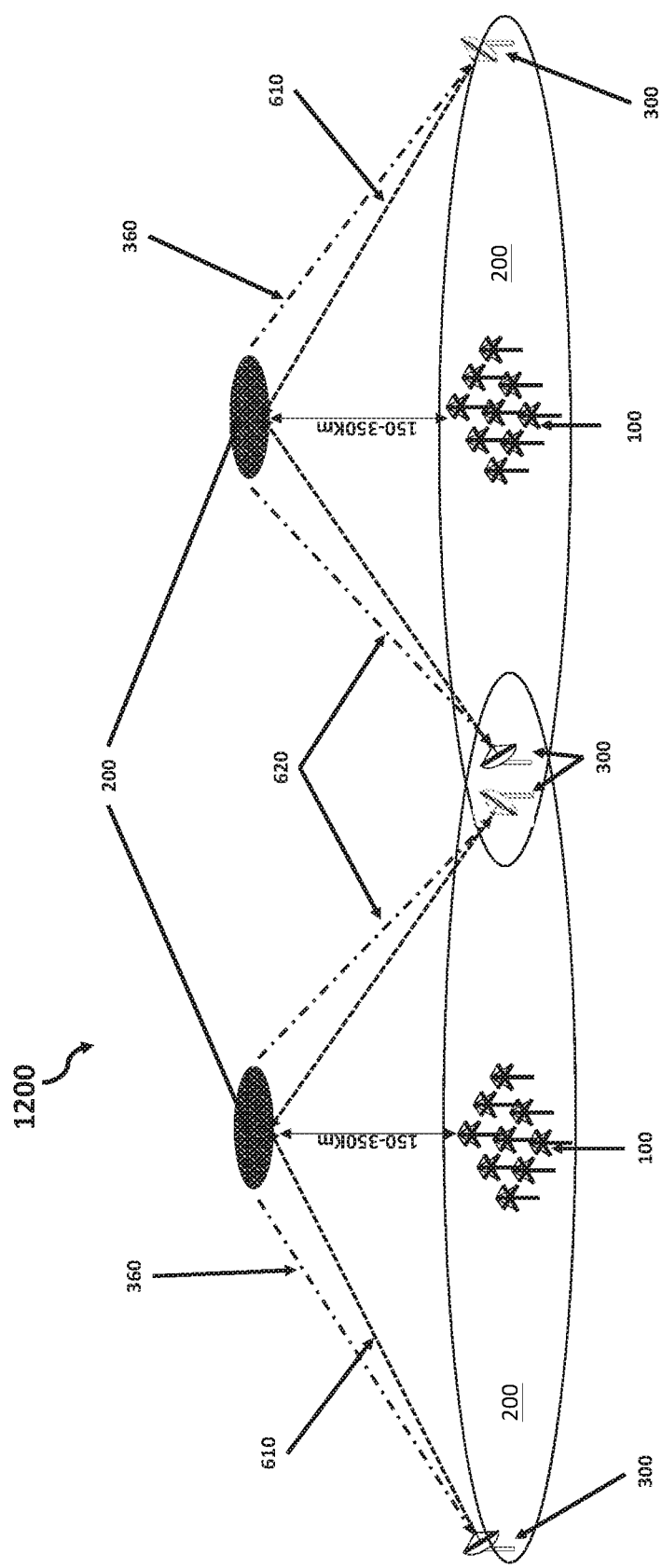
FIG. 12 depicts a meshed HFIL/HFPL region network broadcast system.

FIG. 12 illustrates a 3-dimensional view of a meshed HFIL/HFPL Region Broadcast Network System Configuration 1200. In some embodiments, configuration 1200 extends a data network beyond the line-of-sight of a single HFIL/HFPL Region 200 to one or more other HFIL/HFPL regions. While multiple Transmitters/Receivers 300 may participate in system 1200, for simplicity, a point-to-point configuration is depicted to prevent obscuring FIG. 12, and it should be understood that multiple transmitters/receivers 300 may be added and HFIL/HFPL regions may be established to create additional points in configuration 1200. As previously described for the Broadcast Network System 800 and 1000, a HF Pump 100 may establish a HFIL/HFPL Region 200. In some embodiments, two HFIL/HFPL Regions 200 may be established with a slight overlap in line-of-sight of both HFIL/HFPL Regions 200. A Transmitter/Receiver 300 within one HFIL/HFPL Region 200 may send a Transmitter/Receiver transmission 310 to the HFIL/HFPL Region 200, where the transmission 610 is isotropically repeated as a HFIL/HFPL Repeated Transmission Propagation Pattern 360 at approximately 4 MHz higher than the original frequency of the transmission 310. Another transmitter/receiver 300 within the overlapped region of two separate HFIL/HFPL Regions 200 may receive the HFIL/HFPL Repeated Transmission Propagation Pattern 360. In some embodiments, two transmitters/receivers 300 may be co-located within the overlapped region of the two HFIL/HFPL Regions 200. The co-located transmitters/receivers 300 may receive the HFIL/HFPL Repeated Transmission Propagation Patterns 360 from the Transmitter/Receivers 300 from both HFIL/HFPL Regions 200. In some embodiments, in order to extend the distance to transmit the data in transmission 610 beyond its own HFIL/HFPL Region 200 coverage area, the HFIL/HFPL Repeated Transmission Propagation Pattern 360 from one HFIL/HFPL Region 200 is sent to the Transmitter/Receiver 300 oriented in the adjacent HFIL/HFPL Region 200, and the data of the transmitter/receiver transmission 610 is re-transmitted to the adjacent HFIL/HFPL Region 200. At the adjacent HFIL/HFPL region 200, the transmission 610 is isotropically repeated and received at another Transmitter/Receiver 300 region, which is located outside of the overlapped area of the two HFIL/HFPL Regions 200.

Figure 13:
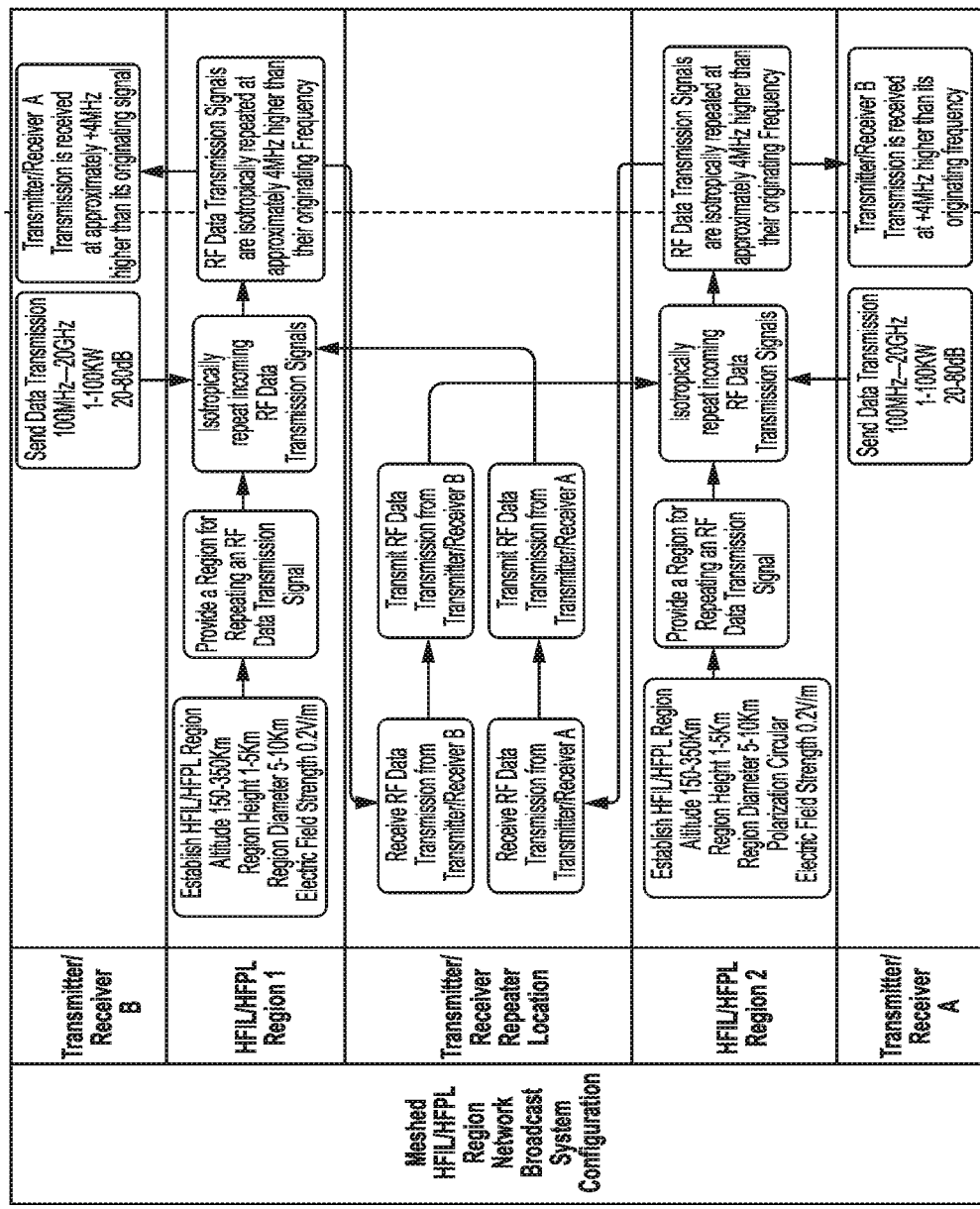
FIG. 13 is a flow chart of a meshed HFIL/HFPL region network broadcast system.

FIG. 13 is process flow of a Meshed HFIL/HFPL Region Broadcast Network System Configuration 1200. The process flow illustrated in FIG. 13 is similar to and describes the processes previously discussed in FIGS. 9 and 11. In addition to the previously discussed processes, in some embodiments, configuration 1200 includes the ability to extend data networks at distances beyond the line-of-sight distance of the HFIL/HFPL Region 200 in which a Transceiver 300 network resides. In some embodiments, the Meshed HFIL/HFPL Region Broadcast Network System 1200 includes two separate HFIL/HFPL regions 200, e.g., HFIL/HFPL Regions 1 and 2, which overlap in an area. Two transceivers 300 may be co-located within the overlapped region of HFIL/HFPL Regions 1 and 2. In some embodiments, the co-located Transceivers 300 may receive HFIL/HFPL Repeated Transmission Propagation Patterns 360 from one HFIL/HFPL region 200, and re-transmit the patterns 360 to the other HFIL/HFPL Region 200, in order to extend data transmissions. It is noted that two meshed HFIL/HFPL Regions 200 are described with reference to FIG. 13, but multiple HFIL/HFPL Regions 200 may be overlap to further extend the data exchange from one transceiver 300 to another transceiver 300.

Figure 14:
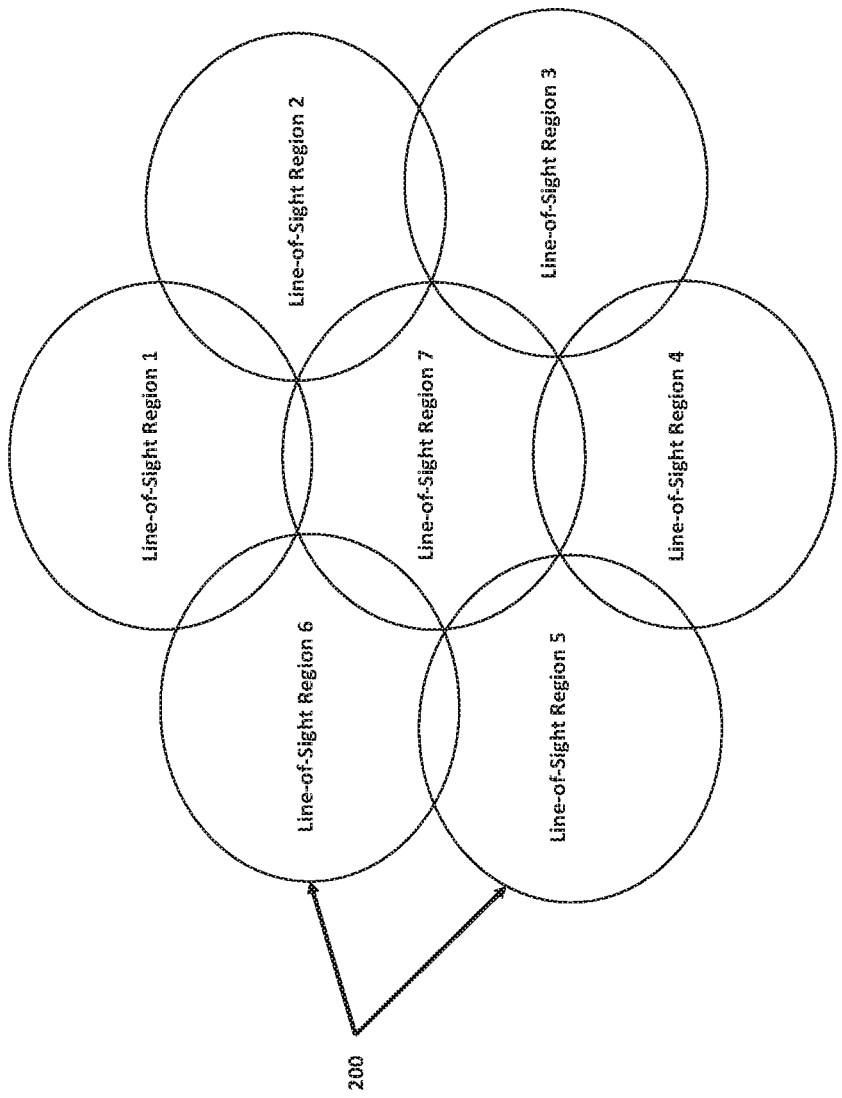
FIG. 14 depicts a top view of multiple meshed HFIL/HFPL regions.

FIG. 14 depicts multiple HFIL/HFPL Regions 200, in which a region overlaps with at least one other region. As described in FIGS. 12 and 13, the slight overlap in line-of-sight distance between HFIL/HFPL Regions 200 enables data to be transmitted beyond the distance of a single HFIL/HFPL Region 200. In some embodiments, a slight overlap of regions may be a distance, e.g., 100 miles, to ensure that signal fade on the outer regions of the coverage area would not impact system performance. In an aspect, the distance of the slight overlap of regions may be an estimated distance and/or determined based on environmental and Transceiver 300 capability considerations.

Figure 15:
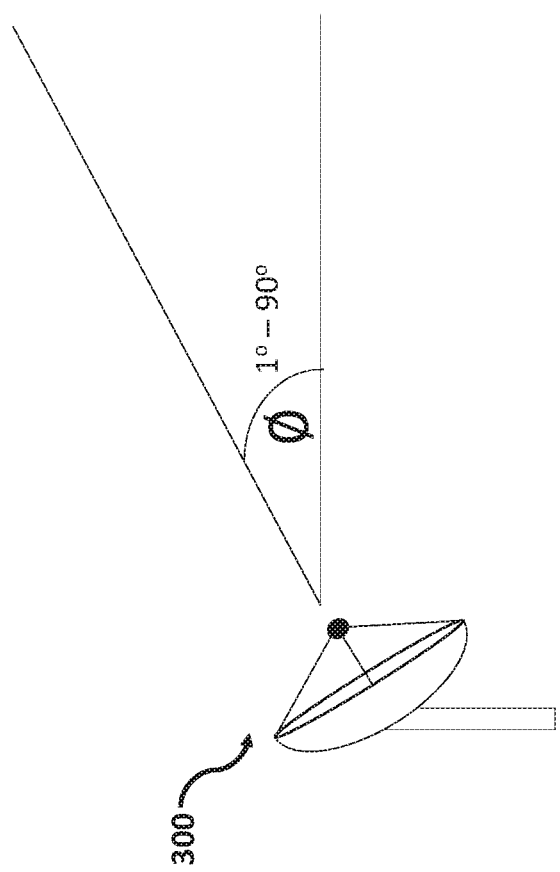
FIG. 15 depicts a side view of a range of transceiver angles.

FIG. 15 depicts the various angles of which a Transceiver 300 antenna may be oriented, in order to transmit and receive RF signals. In various embodiments, the antenna may be oriented from 1° to 90°. The angle of the antenna may be based on the curvature of the Earth and/or terrestrial obstructions. In some embodiments, data exchange can occur between transceivers 300 that reside within line-of-sight of a HFIL/HFPL Region 200.

In various embodiments, network security for the configurations can be provided, for example, through bulk encryption methods. In some embodiments, an encrypted signature may be maintained in the atmosphere by using bulk encryption methods. In other embodiments, invisible or visible signals may be detected. It is noted that the encryption methods described in this disclosure are also not limited in this regard; but rather, other security configurations may be utilized for the configurations described in this disclosure.

While the examples provided are based on existing capabilities and point-to-point communications, in various embodiments, the end-state may, for example, include support point-to-multi-point communications, over-the-horizon, using multiple RF interference points multiplexed together to increase data rates.

The components and/or sub-components described herein are identified based upon the application for which they are implemented in the disclosure. However, it should be appreciated that any particular component and/or sub-component nomenclature herein is used merely for convenience, and thus the disclosure should not be limited to use solely in any specific application identified and/or implied by such nomenclature.

The descriptions of the various embodiments of the disclosure have been presented for purposes of illustration, but are not intended to be exhaustive or limited to the embodiments disclosed. While the invention has been described in terms of preferred embodiments, it will be apparent to those of skill in the art that variations may be applied to the apparatus, configurations, methods, and sequence of steps of the method without departing from the concept, spirit, and scope of the invention. More specifically, it will be apparent that certain components may be added to, combined with, or substituted for the components described herein, while the same or similar results would be achieved. All such similar substitutions and modifications apparent to those skilled in the art are deemed to be within the spirit, scope, and concept of the invention. Moreover, the terminology used herein was chosen to best explain the principles of the embodiments, the practical application or technical improvement over technologies found in the marketplace, or to enable others of ordinary skill in the art to understand the embodiments disclosed herein.

What is claimed is:

1. A network broadcast system comprising:
   at least two transceivers configured to transmit and receive data at different frequencies;
   a high frequency (HF) pump configured to create a High-Frequency Ionized Lines/High-Frequency Plasma Lines (HFIL/HFPL) region; and
   a HF pump controller configured to maintain the HFIL/HFPL region at a consistent altitude and electric field (E-Field) strength,
   wherein one transceiver of the at least two transceivers is further configured to transmit a transmission into the HFIL/HFPL region, and
   wherein the HFIL/HFPL region is further configured to retransmit the transmission to the another transceiver at a frequency different than the frequency of the transmission sent into the HFIL/HFPL region.

2. The system of claim 1, wherein the retransmitted transmission is isotropically repeated to the another transceiver.

3. The system of claim 1, wherein the HF pump controller is further configured to maintain the HFIL/HFPL region at an E-Field strength equal to 0.2V/m.

4. The system of claim 1, wherein the HFIL/HFPL region is maintained to isotropically repeat and receive an incoming RF signal within a line-of-sight of the HFIL/HFPL region.

5. The system of claim 1, wherein the high frequency pump comprises a power generator, a radio frequency (RF) synthesizer, and a high power RF amplifier.

6. The system of claim 5, wherein the high-power RF amplifier is configured to increase power of electromagnetic energy provided by the power generator.

7. The system of claim 5, wherein the RF synthesizer is configured to provide a stable RF source by producing frequencies ranging from 1 MHz-10 MHz.

8. The system of claim 1, wherein the high frequency pump is further configured to create the HFIL/HFPL region at an altitude of 150 kilometers to 350 kilometers.

9. The system of claim 1, wherein the HF pump is further configured to provide a radio frequency within a range of a critical frequency of the altitude of the HFIL/HFPL region.

10. A network broadcast method comprising:
    creating, by a high frequency (HF) pump, a High-Frequency Ionized Lines/High Frequency Plasma Lines (HFIL/HFPL) region;
    maintaining, by a HF pump controller, the HFIL/HFPL region at a consistent altitude and electric field (E-Field) strength;
    transmitting, by a transceiver, a transmission into the HFIL/HFPL region; and
    retransmitting, by the HFIL/HFPL region, the transmission to another transceiver at a frequency different than a frequency of the transmission into the HFIL/HFPL region.

11. The network broadcast method of claim 10, wherein retransmitting the transmission to another transceiver further comprises isotropically repeating the transmission to the another transceiver.

12. The network broadcast method of claim 10, wherein maintaining the HFIL/HFPL region comprises maintaining the HFIL/HFPL region at an E-Field strength equal to 0.2V/m.

13. The network broadcast method of claim 10, wherein maintaining the HFIL/HFPL region comprises maintaining the HFIL/HFPL region to isotropically repeat and receive an incoming RF signal within a line-of-sight of the HFIL/HFPL region.

14. The network broadcast method of claim 10, wherein creating the HFIL/HFPL region comprises creating the HFIL/HFPL region at an altitude of 150 kilometers to 350 kilometers.

15. The network broadcast method of claim 10, further comprising providing a radio frequency within a range of a critical frequency of the altitude of the HFIL/HFPL region.

16. A network broadcast system comprising:
    at least two transceivers configured to transmit and receive data at different frequencies;
    a high frequency (HF) pump configured to create a High-Frequency Ionized Lines/High-Frequency Plasma Lines (HFIL/HFPL) region, and to maintain the HFIL/HFPL region at a consistent altitude and electric field (E-Field) strength; and
    wherein one transceiver of the at least two transceivers is further configured to transmit a transmission into the HFIL/HFPL region, and
    wherein the HFIL/HFPL region is further configured to retransmit the transmission to the another transceiver at a frequency different than the frequency of the transmission sent into the HFIL/HFPL region.

17. The system of claim 16, wherein the retransmitted transmission is isotropically repeated to the another transceiver.

18. The system of claim 16, wherein the HF pump is further configured to maintain the HFIL/HFPL region at an E-Field strength equal to 0.2V/m.

19. The system of claim 16, wherein the HFIL/HFPL region is maintained to isotropically repeat and receive an incoming RF signal within a line-of-sight of the HFIL/HFPL region.

20. The system of claim 16, wherein the HF pump is further configured to provide a radio frequency within a range of a critical frequency of the altitude of the HFIL/HFPL region.

* * * * *